United States Patent
Tsukahara et al.

(10) Patent No.: US 10,198,127 B2
(45) Date of Patent: *Feb. 5, 2019

(54) DISPLAY CONTROL DEVICE, DISPLAY CONTROL METHOD, AND PROGRAM

(71) Applicant: SONY CORPORATION, Tokyo (JP)

(72) Inventors: Tsubasa Tsukahara, Tokyo (JP);
Tomoya Narita, Kanagawa (JP);
Takuro Noda, Tokyo (JP); Hiroyuki Mizunuma, Tokyo (JP); Ikuo Yamano, Tokyo (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,983

(22) Filed: Dec. 22, 2017

(65) Prior Publication Data
US 2018/0121024 A1 May 3, 2018

Related U.S. Application Data

(63) Continuation of application No. 14/430,640, filed as application No. PCT/JP2013/078275 on Oct. 18, 2013, now Pat. No. 9,886,128.

(30) Foreign Application Priority Data

Nov. 2, 2012 (JP) ................................ 2012-242412

(51) Int. Cl.
*G06F 3/041* (2006.01)
*G06F 3/0488* (2013.01)
(Continued)

(52) U.S. Cl.
CPC .......... *G06F 3/0418* (2013.01); *G06F 3/0416* (2013.01); *G06F 3/0488* (2013.01);
(Continued)

(58) Field of Classification Search
CPC .... G06F 3/0418; G06F 3/0416; G06F 3/0488; G06F 3/20; G09G 3/36; G09G 5/00
(Continued)

(56) References Cited

U.S. PATENT DOCUMENTS 7,003,308 B1  2/2006  Fuoss et al.
9,886,128 B2 * 2/2018  Tsukahara ............. G06F 3/0418
(Continued)

FOREIGN PATENT DOCUMENTS

JP   H07-077964 A   3/1995
JP   2000-148134 A   5/2000
(Continued)

OTHER PUBLICATIONS

Mar. 8, 2018, European Brief Communication issued for related EP Application No. 13851293.4.
(Continued)

*Primary Examiner* — Stephen G Sherman
(74) *Attorney, Agent, or Firm* — Paratus Law Group, PLLC

(57) ABSTRACT

The present technology relates to a display control device, a display control method, and a program which allow operability of a touch panel display to be improved. A display data generation unit obtains first display data representing a touch input position by a user on a touch panel display, from a first processing unit through a first path, obtains second display data using the first display data from a second processing unit through a second path, the second processing unit performing display image generation processing involving a processing amount larger than a processing amount of the first processing unit, and performs control to allow first display information based on the first display data and second display information based on the second display data to be displayed on the touch panel display. The present technology is applicable to an LCD module and the like, for example.

13 Claims, 20 Drawing Sheets

(51) Int. Cl.
 *G09G 3/20* (2006.01)
 *G09G 3/36* (2006.01)
 *G09G 5/00* (2006.01)
 *G09G 5/08* (2006.01)

(52) U.S. Cl.
 CPC ............... *G09G 3/20* (2013.01); *G09G 3/36* (2013.01); *G09G 5/00* (2013.01); *G09G 5/003* (2013.01); *G09G 5/08* (2013.01); *G09G 2340/12* (2013.01); *G09G 2360/18* (2013.01)

(58) Field of Classification Search
 USPC ......... 345/173–178; 178/18.01–18.09, 18.11
 See application file for complete search history.

(56) References Cited

U.S. PATENT DOCUMENTS

| | | |
|---|---|---|
| 2009/0061837 A1 | 3/2009 | Chaudhri et al. |
| 2010/0210332 A1 | 8/2010 | Imai |
| 2012/0062593 A1 | 3/2012 | Kojima |
| 2013/0321340 A1 | 12/2013 | Seo et al. |

FOREIGN PATENT DOCUMENTS

| | | |
|---|---|---|
| JP | 2009-009750 A | 1/2009 |
| JP | 2012-084125 A | 4/2012 |
| WO | WO2012/108668 A2 | 8/2012 |

OTHER PUBLICATIONS

Wikipedia, Jul. 6, 2012, pp. 1-2, Internet, URL:https://en.wikipedia.org/w/index.php?title=Pointer_(user_interface)&oldid=502609754.

\* cited by examiner

DISPLAY CONTROL DEVICE, DISPLAY CONTROL METHOD, AND PROGRAM

CROSS REFERENCE TO PRIOR APPLICATION

This application is a continuation of U.S. patent application Ser. No. 14/430,640 (filed on Mar. 24, 2015), which is a National Stage Patent Application of PCT International Patent Application No. PCT/JP2013/078275 (filed on Oct. 18, 2013) under 35 U.S.C. § 371, which claims priority to Japanese Patent Application No. 2012-242412 (filed on Nov. 2, 2012), which are all hereby incorporated by reference in their entirety.

TECHNICAL FIELD

The present invention relates to a display control device, a display control method, and a program, and in particular, to a display control device, a display control method, and a program which allow operability of a touch panel display to be improved.

BACKGROUND ART

A liquid crystal display having a touch detection device what is called a touch panel (hereinafter, referred to as a touch sensor) has been known. The liquid crystal display is configured such that a liquid crystal panel is overlaid with a touch sensor, and various types of buttons are displayed as images on the liquid crystal display screen to thereby allow information to be input using such buttons instead of conventional buttons. By applying this technology to a small-sized mobile device, a display and placement of buttons can be made in common, which provides significant advantages such as enlargement of a screen, reduction in the space of an operation unit, and reduction in the number of components.

However, the structure in which the liquid crystal panel is overlaid with the touch sensor causes a problem that the entire liquid crystal module becomes thick. As such, in order to make it thinner, for example, a liquid crystal display having a touch sensor has been proposed in which a conductive film for the touch sensor is provided between a monitoring-side substrate of the liquid crystal display element and a polarizer for observation disposed on the outside thereof, and a capacitance type touch sensor, in which the outer surface of the polarizer is used as a touching face, is formed between the conductive film for the touch sensor and the outer surface of the polarizer (for example, see Patent Document 1).

FIG. 1 illustrates a control block diagram regarding display, control processing of a personal computer using a liquid crystal display having a touch sensor.

The personal computer includes an LCD module 10, and as a processing unit of the host side for controlling it, a host processing unit 14. The LCD module 10 includes a touch panel display 11, and driver ICs 12 and 13.

The touch panel display 11 is configured of a touch panel 21 and an LCD panel 22, the driver IC 12 is a control IC (Integrated Circuit) for the touch panel 21, and the driver IC 13 is a control IC for the LCD panel 22.

The driver IC 12 includes a touch panel driver 31, a detention circuit 32, and a coordinate conversion circuit 33.

The touch panel driver 31 scan-drives belt-shaped conductive film lines arrayed in multiple numbers in an X-axis direction and a Y-axis direction, respectively, on the touch panel 21. The detection circuit 32 detects an analog sensor signal representing a capacitance value corresponding to presence/absence of a touch (contact) by a user at a given position on the touch panel 21, according to the scan-driving of the touch panel driver 31, and AD-converts it to a digital signal. The coordinate conversion circuit 33 converts the digital sensor signal representing the touch detection position detected by the detection circuit 32 into a two-dimensional coordinate position expressed by the X coordinate position and the Y coordinate position of the touch panel 21, and outputs it to the host processing unit 14 as raw coordinate information.

The driver IC 13 includes an LCD driver 41, a memory 42, and a timing controller 43.

To the driver IC 13, display data of display information A, based on the result of operation such as calibration and filtering performed an the raw coordinate positions indicating the touch position output from the driver IC 12, is supplied from the host processing unit 14.

The LCD driver 41 drives, in a predetermined sequence, respective pixels of the LCD panel 22 arrayed in multiple numbers two-dimensionally based on the display data stored in the memory 42, in order to allow the display information. A supplied from the host processing unit 14 to be displayed. The memory 42 stores display data of the display information A supplied from the host processing unit 14. The timing controller 43 obtains the display data of the display information A supplied from the host processing unit 14 and stores if in the memory 42.

The host processing unit 14 includes a CPU (Central Processing Unit) 51, a memory (RAM: Random Access Memory) 52, a graphics controller 53, and an image memory (VRAM) 54.

The CPU 51 is a processor which controls the whole personal computer, and executes device drivers of the respective devices provided to the personal computer, the operation system (OS), application programs, and the like. The memory 52 stores data necessary for performing given processing by the CPU 51, namely, an execution program and the like, for example.

Further, when the CPU 51 obtains raw coordinate position indicating the touched position by the user from the driver IC 12 of the LCD module 10 as raw coordinate information, the CPU 51 calculates the centroid of the raw coordinate position, performs equalization, and the like, to thereby accurately calibrate the touched position by the user, and calculates the touched position after the calibration (calibration coordinate position).

The graphics controller 53 is a processor for displaying an image on the LCD panel 22, and outputs display data of an image to be displayed on the LCD panel 22 to the driver IC 13 of the LCD panel 22, while storing it in an image memory 54 as appropriate. For example, the graphics controller 53 outputs, to the driver IC 13 of the LCD panel 22, display data of the display information. A as a display image responding to the touched position, based on the calibration coordinate position of the user.

CITATION LIST

Patent Document

Patent Document 1: Japanese Patent Application Laid-Open No. 2009-9750

SUMMARY OF THE INVENTION

Problems to be Solved by the Invention

Brief description will be given on the flow of processing from the time when a given position on the touch panel 21 is touched by a user to the time when the display information A corresponding thereto is displayed on the LCD panel 22, in the configuration illustrated in FIG. 1.

When a user touches a given position on the touch panel 21, an analog sensor signal of a capacitance value representing the touch is detected by the detection circuit 32. The analog sensor signal is converted to a digital sensor signal by the detection circuit 32, and then converted to a two-dimensional coordinate position by the coordinate conversion circuit 33, and supplied to the CPU 51 of the host processing unit 14 as raw coordinate information.

The CPU 51 of the host processing unit 14 performs calibration and the like on the two-dimensional coordinate position as raw coordinate information to thereby calculate a calibration coordinate position corresponding to the touched position by the user. Then, display data of the display information A, generated based on the calculated calibration coordinate position, is supplied to the driver IC 13 of the LCD panel 22 via the graphics controller 53.

The timing controller 43 of the driver IC 13 of the LCD panel 22 obtains the display data of the display information A and stores it in the memory 42, and the LCD driver 41 drives the LCD panel 22 according to the display data of the display information A stored in the memory 42. Thereby, the display information A is displayed on the LCD panel 22.

As described above, in the conventional touch panel display control, raw coordinate information indicating a detected touched position is supplied to the CPU 51, and after being applied with complicated arithmetic processing such as filtering and calibration by the CPU 51, it is displayed on the LCD panel 22.

Accordingly, from the time when a user performs operation on the touch panel display 11 until an image responding to the operation is displayed on the LCD panel 22, a delay is caused. When a user performs a quick operation (input), such a delay is particularly notable, giving a stress to the user due to low operation feeling.

The present technology, which has been made in view of such a situation, aims to allow the operability of a couch panel display to be improved.

Solutions to Problems

A display control device according to an aspect of the present technology includes a display control unit that obtains first display data representing a touch input position by a user on a touch panel display, from a first processing unit through a first path, obtains second display data using the first display data from a second processing unit through a second path, the second processing unit performing display image generation processing involving a processing amount larger than a processing amount of the first processing unit, and performs control to allow first display information based on the first display data and second display information based on the second display data to be displayed on the touch panel display.

A display control method according to an aspect of the present technology includes obtaining first display data representing a touch input position by a user on a touch panel display, from a first processing unit through a first path, obtaining second display data using the first display data from a second processing unit through a second path, the second processing unit performing display image generation processing involving a processing amount larger than a processing amount of the first processing unit, and performing control to allow first display information based on the first display data and second display information based on the second display data to be displayed on the touch panel display.

A program according to an aspect of the present technology is a program for causing a computer to perform processing of obtaining first display data representing a touch input position by a user on a touch panel display, from a first processing unit through a first path, obtaining second display data using the first display data from a second processing unit through a second path, the second processing unit performing display image generation processing involving a processing amount larger than a processing amount of the first processing unit, and performing control to allow first display information based on the first display data and second display information based on the second display data to be displayed on the touch panel display.

An aspect of the present technology includes obtaining first display data representing a touch input position by a user on a touch panel display, from a first processing unit through a first path, obtaining second display data using the first display data from a second processing unit through a second path, the second processing unit performing display image generation processing involving a processing amount larger than a processing amount of the first processing unit, and performing control to allow first display information based on the first display data and, second display information based on the second display data to be displayed on the touch panel display.

It should be noted that the program may be provided by being transmitted via a transmission medium or being recorded on a record medium.

The display control device may be an independent device or an inner block constituting a device, Effects of the Invention According to an aspect of the present technology, it is possible to improve the operability of the touch panel display.

MODE FOR CARRYING OUT THE INVENTION

Figure 1:
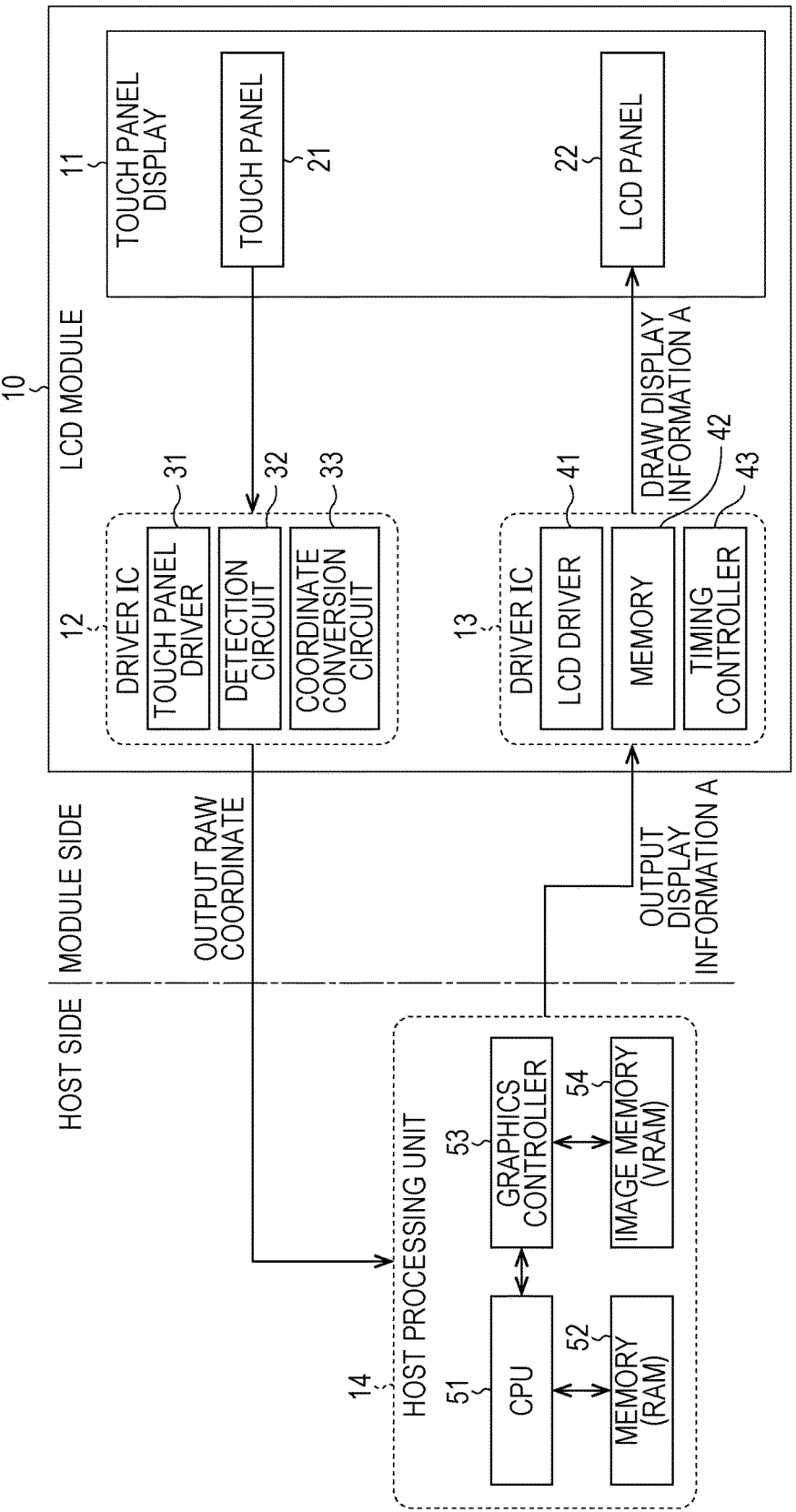
FIG. 1 is a control block diagram regarding conventional display control on a touch input.

Hereinafter, modes for carrying out the present technology (hereinafter referred to as embodiments) will be described. It should be noted that description will be given in the following order.

1. Description of structure of touch panel to which the present technology is applied
2. First embodiment of LCD module
3. Second embodiment of LCD module
4. Third embodiment of LCD module
5. Exemplary configuration of personal computer
6. Exemplary configuration of mobile phone terminal
7. Exemplary variations <1. Description of structure of touch panel to which the present technology is applied>

First, a structure of a touch panel display, to which the present technology described below is applicable, will be described with reference to FIG. 2 and FIG. 3.

Figure 2:
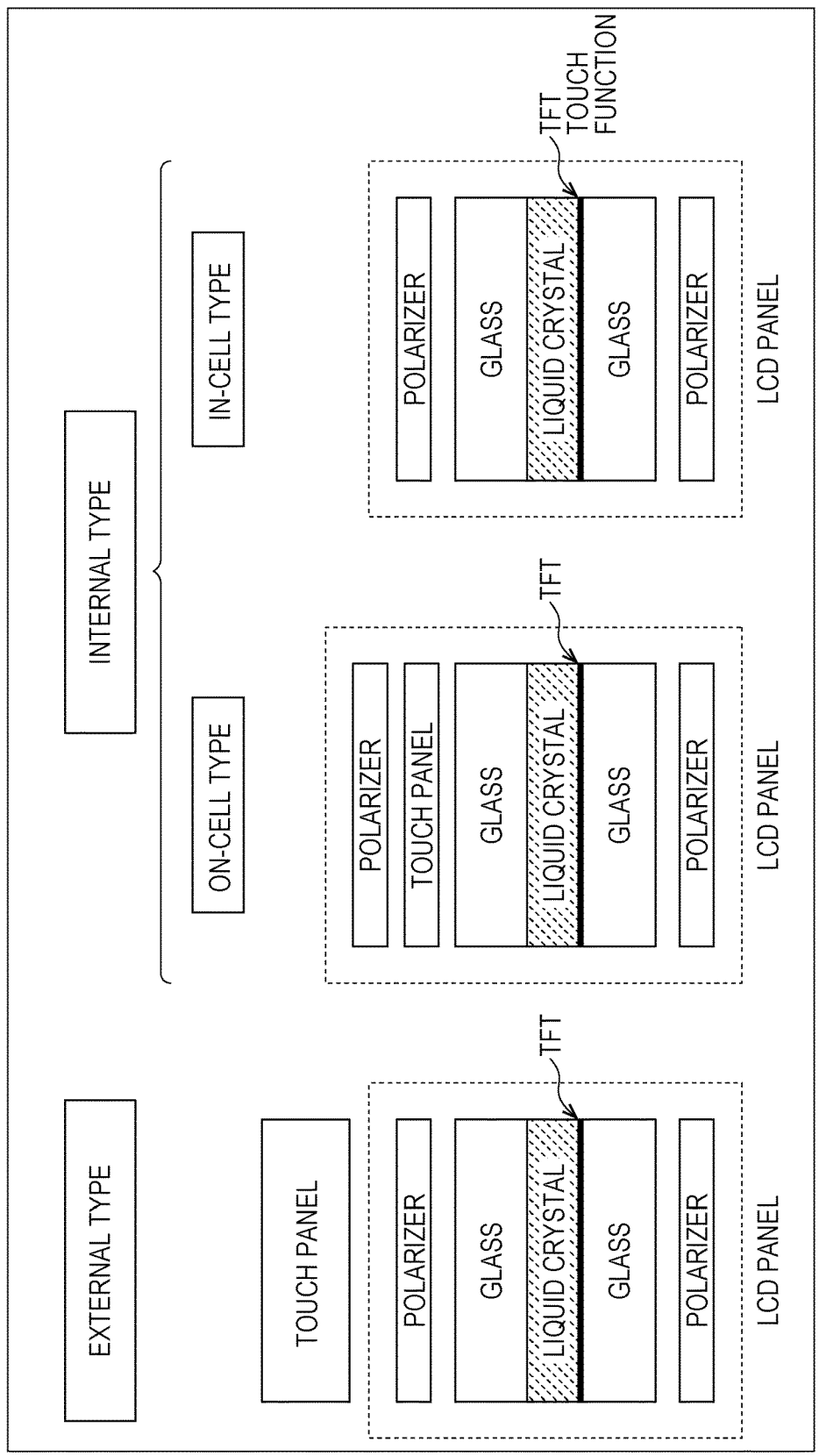
FIG. 2 is a drawing explaining a structure of a touch panel display to which the present technology is applicable.

As illustrated in FIG. 2, structures of touch panel displays are largely classified into an external type and an internal type.

An external-type touch panel display has a form in which a touch panel is attached to a surface of an LCD panel. A touch panel display 11 illustrated in FIG. 1 is configured of a touch panel 21 and an LCD panel 22, which falls under the external type. In the external type, as an image display panel and a touch panel are configured separately, the image display panel may be a PDP panel, an OLED panel, or the like, other than the LCD panel.

On the other hand, an internal-type touch panel display has a structure in which a touch panel function is formed inside the panel of an LCD panel, which is further classified into an in-cell type and an on-cell type.

The in-cell type is one in which a touch panel function is incorporated inside a TFT-LCD cell, and an on-cell type is one in which a touch panel function is incorporated between a polarizer and a glass substrate provided with a color filter.

Figure 3:
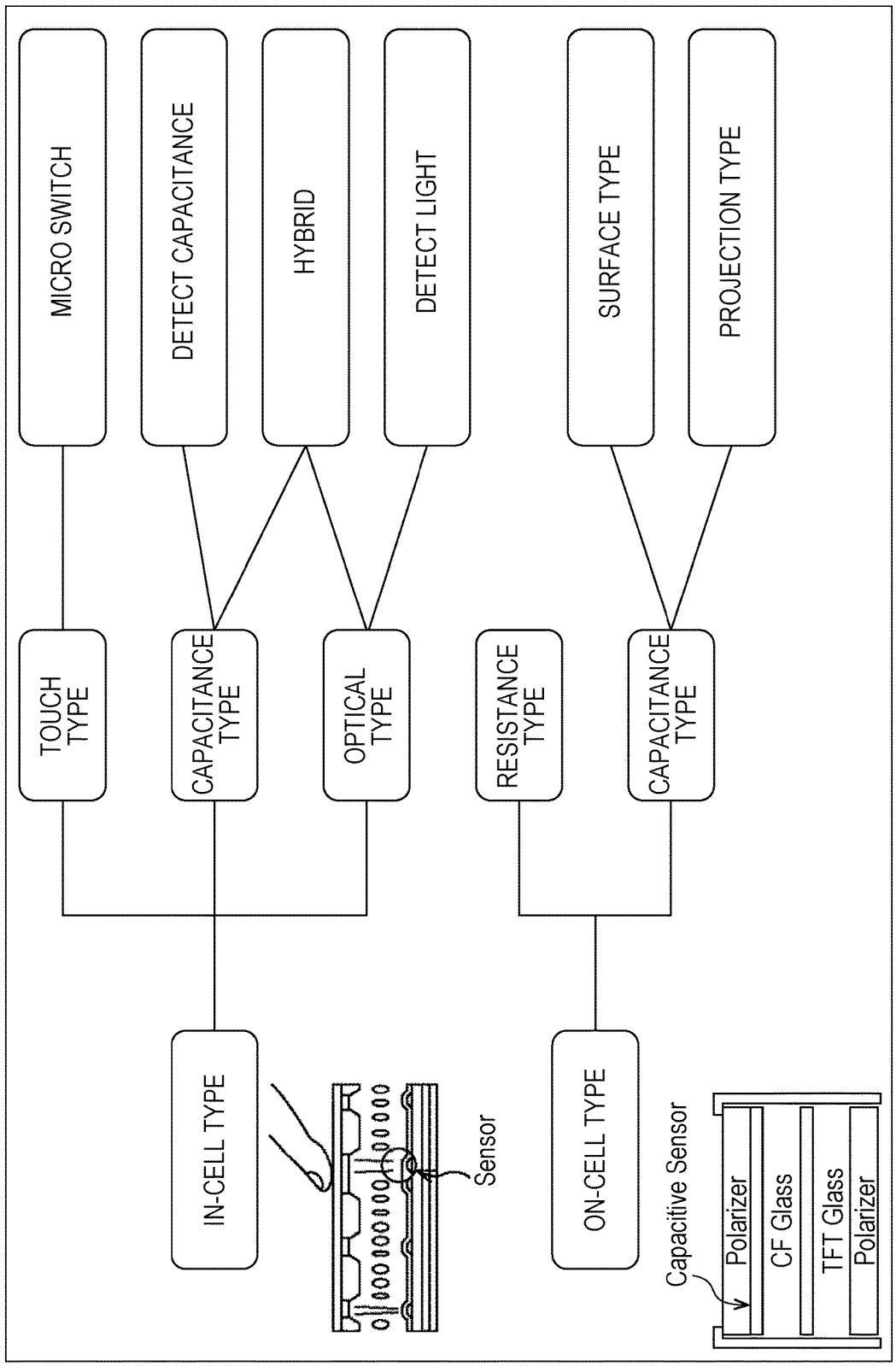
FIG. 3 is a drawing explaining a structure of a touch panel display to which the present technology is applicable.

As illustrated in FIG. 3, detection methods of the in-cell type include a touch type using a micro switch, a capacitance type which detects variations in electrostatic capacitance, and an optical type which detects light. There is also a hybrid type using both the capacitance detection and the optical detection.

On the other hand, detection methods of the on-cell type include a resistance type which detects variations in a resistance value (voltage value) and a capacitance type which detects variations in electrostatic capacitance.

While touch panel displays can be classified into those having various types of structures as described above, the present technology is applicable to all structures regardless of an external type, an internal type, an on-cell type or an in-cell type. However, in the respective embodiments described below, an example of adopting a touch panel display of an in-cell type (internal type) using a capacitance-type detection method will be described. Further, while the internal-type touch panel display described below is configured such that a touch panel function is formed inside the panel of an LCD panel, the present technology is also applicable to one in which a touch panel function is formed inside the panel of an OLED panel, and the like. The internal-type touch panel display has advantages such as an improvement in visibility, an increase in the density of a touch determination area, an improvement in S/N ratio of a sensor signal, a thinner display thickness, while having a touch sensor function. In particular, with densification of a touch area and an improvement in S/N ratio of sensor signals, detection can be made when a finger just approaches the internal-type touch panel display, whereby new operating experience, such as proximity sensing, may be realized.

<2. First embodiment of LCD module>

A first embodiment of an LCD module, to which the present technology is applied, will be described.

Figure 4:
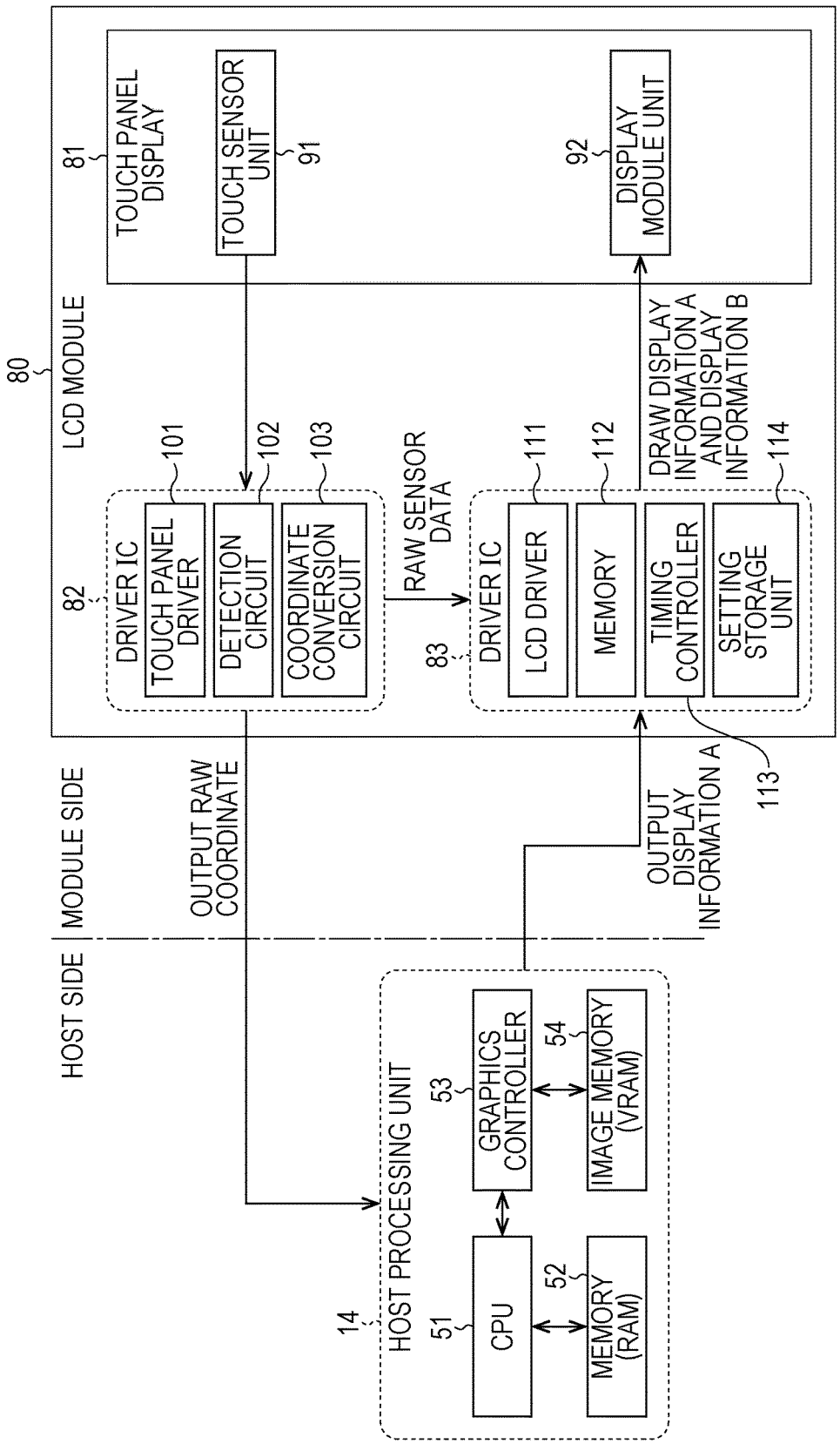
FIG. 4 is a block diagram illustrating an exemplary configuration of a first embodiment of an LCD module to which the present technology is applied.

FIG. 4 illustrates a block diagram of an LCD module 80 to which the present technology is applied, and a host processing unit 14 which controls it. The LCD module 80 and the host processing unit 14 are configured as part of a personal computer, for example, similar to FIG. 1.

The LCD module 80 includes a touch panel display 81 and driver ICs 82 and 83. The host processing unit 14 is a processing unit on the host side, similar to FIG. 1, and controls the LCD module 80. As description of the host processing unit 14 overlaps the above description, it is omitted.

The touch panel display 81 is of an internal type and an in-cell type as described above, which is a touch panel display adopting a capacitance-type detection method, for example, and includes a touch sensor unit 91 and a display module unit 92.

The driver IC 82 includes a touch panel driver 101, a detection circuit 102, and a coordinate conversion circuit 103, and controls the touch sensor unit 91.

The touch sensor unit 91 outputs a sensor signal, detected at each of the areas formed by dividing the display face of the touch panel display 81 into a plurality of areas of two-dimensional arrays, to the detection circuit 102 in a given sequence by drive control of the touch panel driver 101. The touch panel driver 101 drive-controls the touch sensor unit 91.

In response to drive control by the touch panel driver 101, the detection circuit 102 detects (obtains) an analog sensor signal representing an electrostatic capacitance value corresponding to presence/absence of a touch by the user at a given position (each area) of the touch panel display 81, and AD-converts it to a digital signal.

The detection circuit 102 supplies the digital sensor signal to the coordinate conversion circuit 103, and also outputs it to the driver IC 83 as sensor data in raster format.

The coordinate conversion circuit 103 converts a digital sensor signal at a given position detected by the detection circuit 102 into a two-dimensional coordinate position represented by an X coordinate position and a Y coordinate position of the touch panel display 81, and outputs it to the host processing unit 14 as raw coordinate information.

The driver IC 83 includes an LCD driver 111, a memory 112, a timing controller 113, and a setting storage unit 114, and controls the display module unit 92.

The LCD driver 111 drives (transistors in) the respective pixels of the display module unit 92, arrayed two-dimensionally in plural numbers, in a given sequence, in order to display display information stored in the memory 112.

The memory 112 stores display data of display information to be displayed in the display module unit 92. Similar to the memory 42 of FIG. 1, the memory 112 stores display data of display information A supplied from the host processing unit 14, and display data of display information B corresponding to sensor data directly supplied from the detection circuit 102 of the driver IC 82 not via the host processing unit 14.

The sensor data directly supplied from the detection circuit 102 of the driver IC 82 is a digital sensor signal indicating a touched part by a user. While the touched position is specified, color information indicating a color to be displayed is not included. As such, the memory 112 generates display data to be drawn in a color indicated by the color information stored in the setting storage unit 114 at the display position indicated by the sensor data supplied from the detection circuit 102, and stores it as display data of the display information B corresponding to the supplied sensor data.

Here, the display information B is first display information in which the touched position by the user detected by the touch sensor unit 91 is fed back quickly, and the display information A supplied via the host processing unit 14 is second display information in which the touched position by the user detected by the touch sensor unit 91 is calibrated and the like by the host processing unit 14.

In the memory 112, update of drawing information of the display information B based on the sensor data from the driver IC 82 and update of drawing information of the display information A from the graphics controller 53 of the host processing unit 14 are performed in parallel at different timing intervals, respectively. As update of the drawing information of the display information B from the driver IC 82 does not need to perform complicated operation such as calibration and filtering which are performed by the host processing unit 14, it is performed at shorter intervals than the update intervals of the drawing information of the display information A. Accordingly, when a touch by a user is detected by the touch sensor unit 91, the display information B corresponding to the touch is first drawn on the display, and then the display information A, in which operation such as calibration has been performed by the host processing unit 14, is drawn (redrawn) on the display.

The timing controller 113 obtains display data of the display information A supplied from the host processing unit 14, and stores it in the memory 112.

The setting storage unit 114 stores color information for determining a drawing color when a touched position is drawn, for generating the display information B based on the sensor data from the driver IC 82. The color information is stored in the setting storage unit 114 in advance, by being set on a given application executed in the CPU 51, for example.

It should be noted that it is also possible that the display information B based on the sensor data from the driver IC 82 is not stored in the memory 112, and that the LCD driver 111 obtains the sensor data from the driver IC 82 to thereby generate the display information B, and directly draws it on the display module unit 92.

<Exemplary Display with Respect to Touch Input by User>

Figure 5:
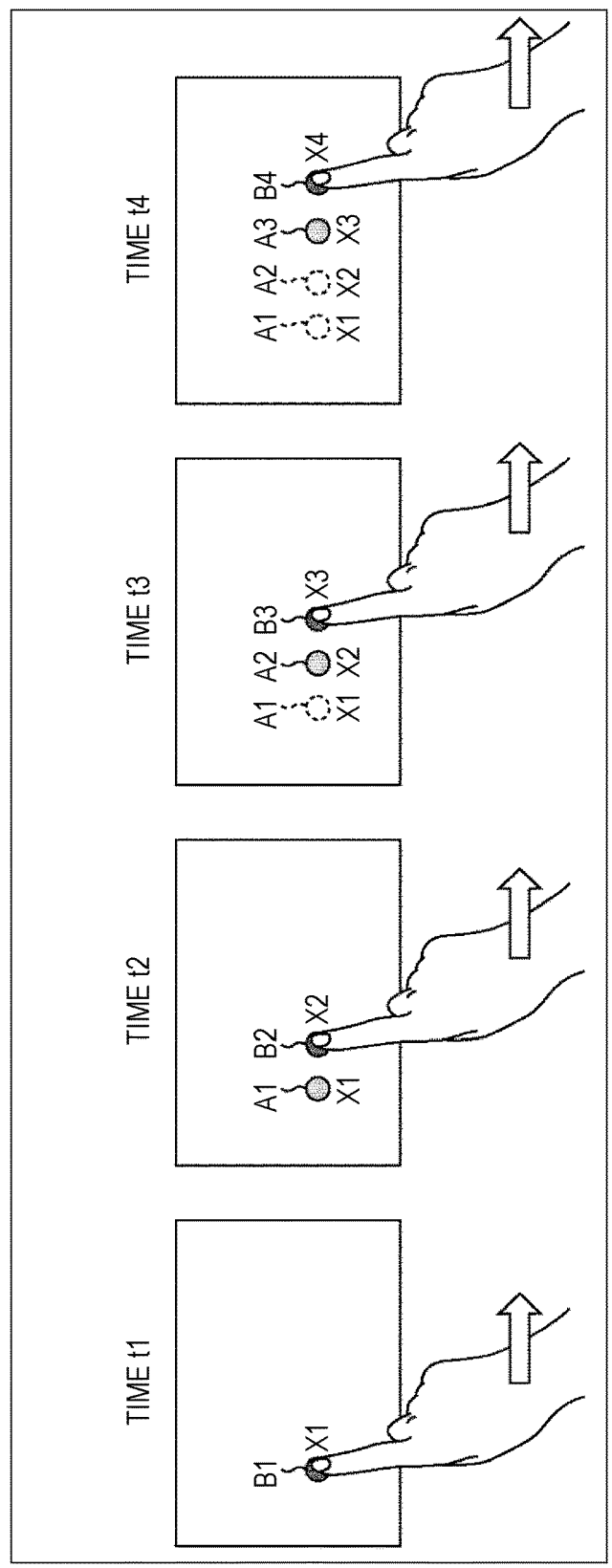
FIG. 5 is a drawing illustrating exemplary displays with respect to touch inputs using the present technology.

FIG. 5 illustrates an exemplary display in which a position of the display touched by a user is drawn with dots by the host processing unit 14 and the LCD module 80 of FIG. 4.

As illustrated in FIG. 5, it is assumed that a user touches the display of the touch panel display 81 with a finger, and performs a sliding operation (input) in a left to right direction from a time t1 to a time t4.

At the time t1, when the user touches a given position X1 on the display of the touch panel display 81, at the moment the user touches, sensor data of the touch position X1 is supplied from the driver IC 82 to the driver IC 83. Then, by the driver IC 83, a point B1 is drawn at the same position as the position X1 touched by the user, as display information B1 at the time t1.

The raw coordinate information of the touch position X1 is supplied to the host processing unit 14, and calibration processing and the like is performed thereon in the host processing unit 14, and the information is supplied to the driver IC 83 as display data of display information A1. Then, at the time t2 after a given period has elapsed from the time t1, when the user touches a position X2 which is on the left side of the position X1, a point A1 based on the display data of the display information A1 is drawn at the position X1, along with a point B2 drawn as display information B2 at the position X2. This means that the point A1 (display information A1) generated via the host processing unit 14 is displayed at the time t2 when the position X2 is touched, delayed from the time t1.

Similarly, at the time t3, a point 53 as display information 53 is drawn at a position X3 where the user touches, and a point A2, generated by the host processing unit 14 and displayed in a delayed manner, is drawn at the position X2.

At the time t4, a point B4 as display information B4 is drawn at a position X4 where the user touches, and a point A3, generated by the host processing unit 14 and displayed in a delayed manner, is drawn at the position X3.

For comparison, the case of drawing the same touching and sliding operation by a conventional display control method will be described.

Figure 6:
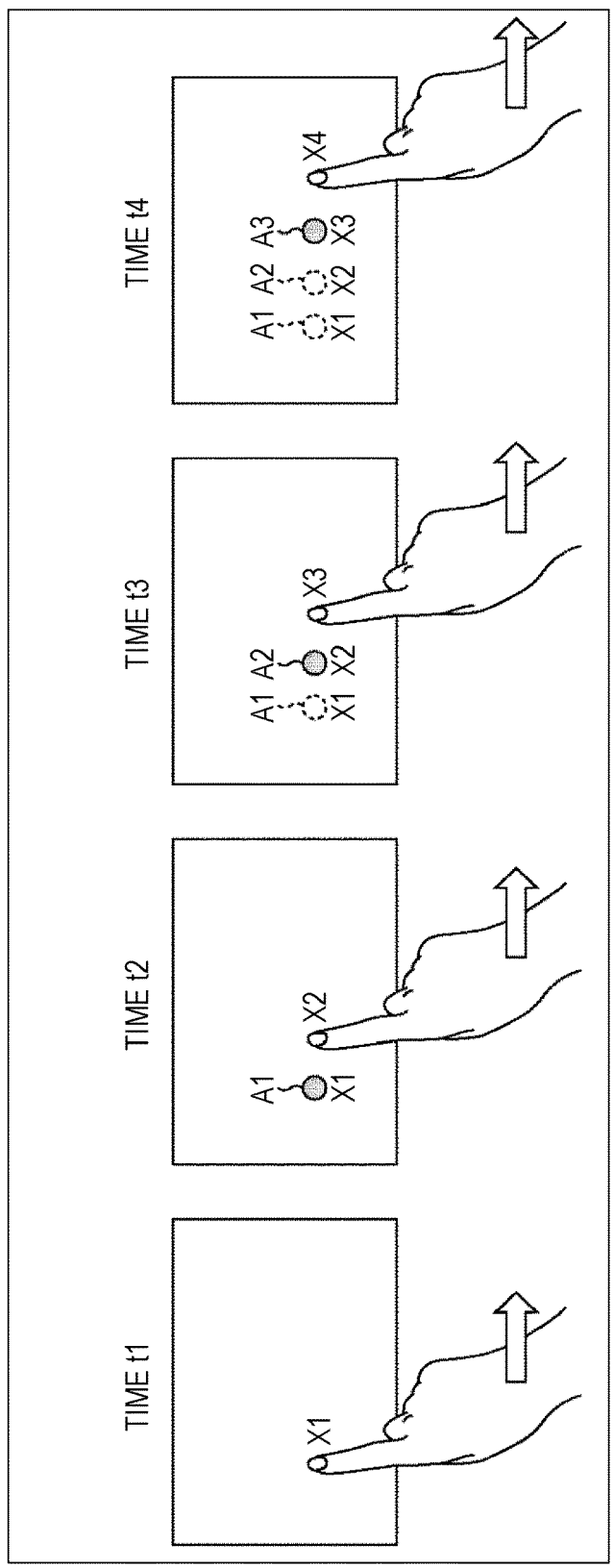
FIG. 6 is a drawing illustrating conventional exemplary displays with respect to touch inputs.

FIG. 6 illustrates an exemplary display of the case where the same touching and sliding operation is drawn by a conventional display control method.

In the conventional display control method, there is no path for directly supplying sensor data indicating a touched position by a user from the driver IC 82 to the driver IC 83 not via the host processing unit 14. As raw coordinate information of the touch position X1 touched by the user is supplied to the host processing unit 14 and applied with calibration operation and then supplied to the driver IC 83, a processing delay is caused by the calibration operation and the like until the point A1 is drawn at the position X1. As such, at the time t1 of the moment the user touches the touch position X1, nothing is drawn on the display as illustrated in FIG. 6.

Then, at the time t2 delayed from the time t1 by a given period, the point A1 is drawn at the position X1. However, at the time t2, the user slid the finger position, and the finger of the user has moved to the position X2. Similarly, at the time t3 when the user touches the position X3, the point A2 is drawn at the position X2 which was touched at the time t2 just before it, and at the time t4 when the user touches the position X4, the point A3 is drawn at the position X3 which was touched at the time t3 just before it.

In this way, according to the conventional display control method, as there is no path for directly supplying sensor data indicating the touched position by the user from the driver IC 82 to the driver IC 83 not via the host processing unit 14, a delay is caused in the drawing timing corresponding to a detected touch.

On the other hand, according to the display control of the LCD module 80 to which the present technology is applied, before the display information A is drawn based on the display data from the host processing unit 14, the display information B is first drawn based on the sensor data directly supplied from the driver IC 82 to the driver IC 83 not via the host processing unit 14. Thereby, it is possible to reduce a delay in drawing the display information A felt by the user (the user is less likely to feel a delay in drawing the display information A).

In this way, according to the display control of the LCD module 80 to which the present technology is applied, it is possible to provide quick feedback to a touch input by the user, and to suppress degradation in operability due to a delay in drawing via the host processing unit 14. This means that it is possible to improve the operability of the touch panel display, <3. Second embodiment of LCD module>

Neat, a second embodiment of an LCD module will be described.

Figure 7:
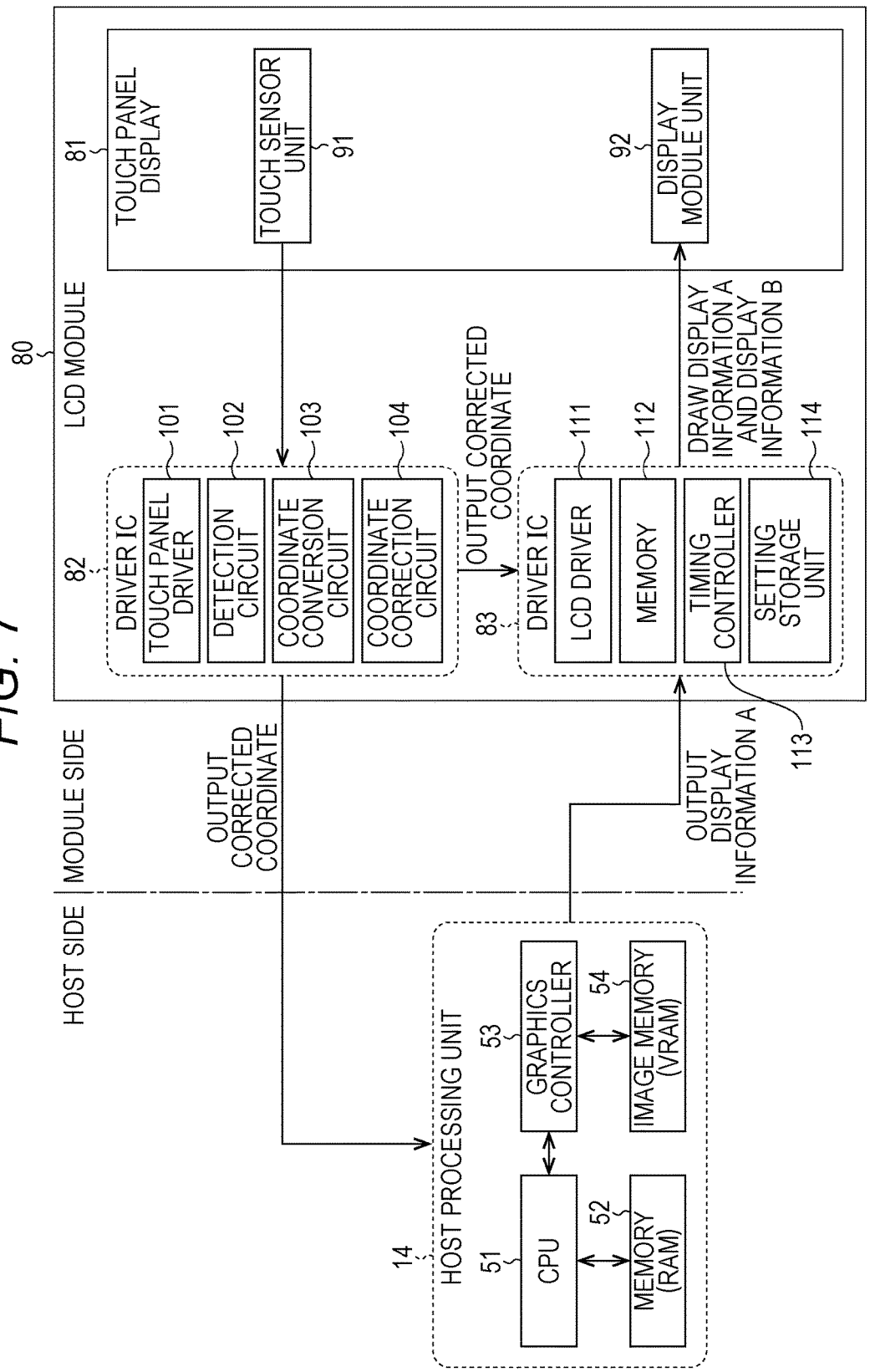
FIG. 7 is a block diagram illustrating ax exemplary configuration of a second embodiment of an LCD module to which the present technology is applied.

FIG. 7 Illustrates a block diagram of the LCD module 80 of the second embodiment and the host processing unit 14 which controls it.

The LCD module 80 of the second embodiment differs from that of the first embodiment illustrated in FIG. 4 in that a coordinate correction circuit 104 is newly added to the driver IC 82.

In the first embodiment, a two-dimensional coordinate position of the touch panel display 81, touched by a user, is output to the host processing unit 14 as raw coordinate information, and in the host processing unit 14, calibration is performed in which correction operation of an average value and a standard deviation of the raw coordinate position is performed to thereby calculate the touched position accurately.

In the second embodiment, calibration for calculating the accurate touched position by a user based on raw coordinate information, performed by the host processing unit 14 in the first embodiment described above, is performed by the coordinate correction circuit 104. The coordinate correction circuit 104 outputs corrected coordinate values indicating a touched position by the user after the correction operation, to the host processing unit 14 and the driver IC 83, as corrected coordinate information.

The configuration of the second embodiment is useful in the case where a storage device on the host side, which stores correction data for calibration, is write-protected, or the host side to be connected is unspecified.

<4. Third embodiment of LCD module>

Next, a third embodiment of an LCD module will be described.

Figure 8:
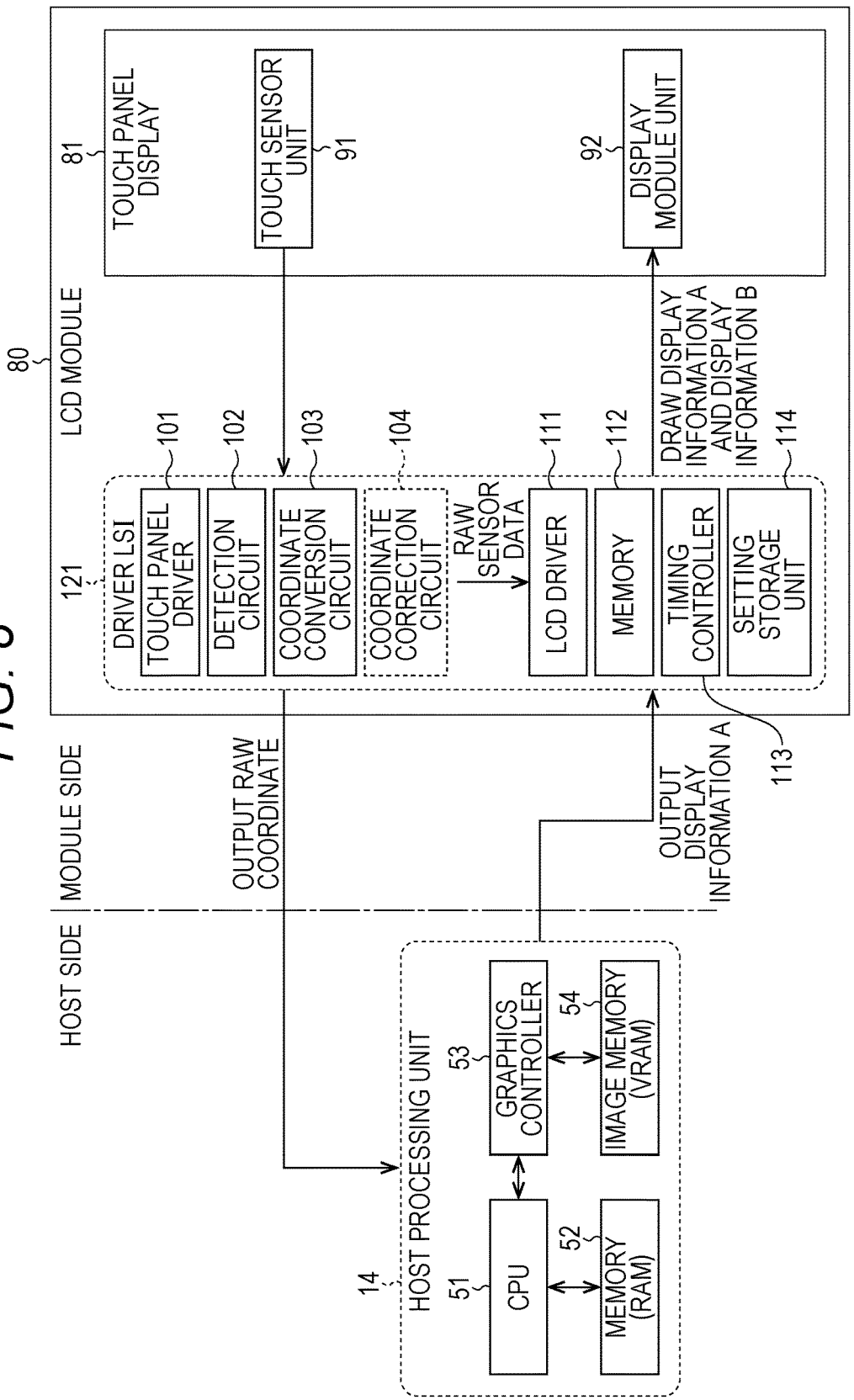
FIG. 8 is a block diagram illustrating an exemplary configuration of a third embodiment of an LCD module to which the present technology is applied.

FIG. 8 illustrates a block diagram of the LCD module 80 of the third embodiment and the host processing unit 14 which controls it.

The LCD module 80 of the third embodiment differs from those of the first and second embodiments in that the LCD module 80 is configured of one driver LSI (Large Scale Integration) 121, while it is configured of two driver ICs, namely, the driver IC 82 and driver IC 83, in the first and second embodiments. Other aspects are the same.

The driver LSI 121 is formed on one semiconductor substrate using single-crystal silicon by means of well-known complementary MOS integrated circuit fabrication technique, for example.

In the driver LSI 121, a configuration in which the coordinate correction circuit 104 is omitted corresponds to the first embodiment of FIG. 4, and a configuration in which the coordinate correction circuit 104 is added corresponds to the second embodiment of FIG. 7.

Figure 9:
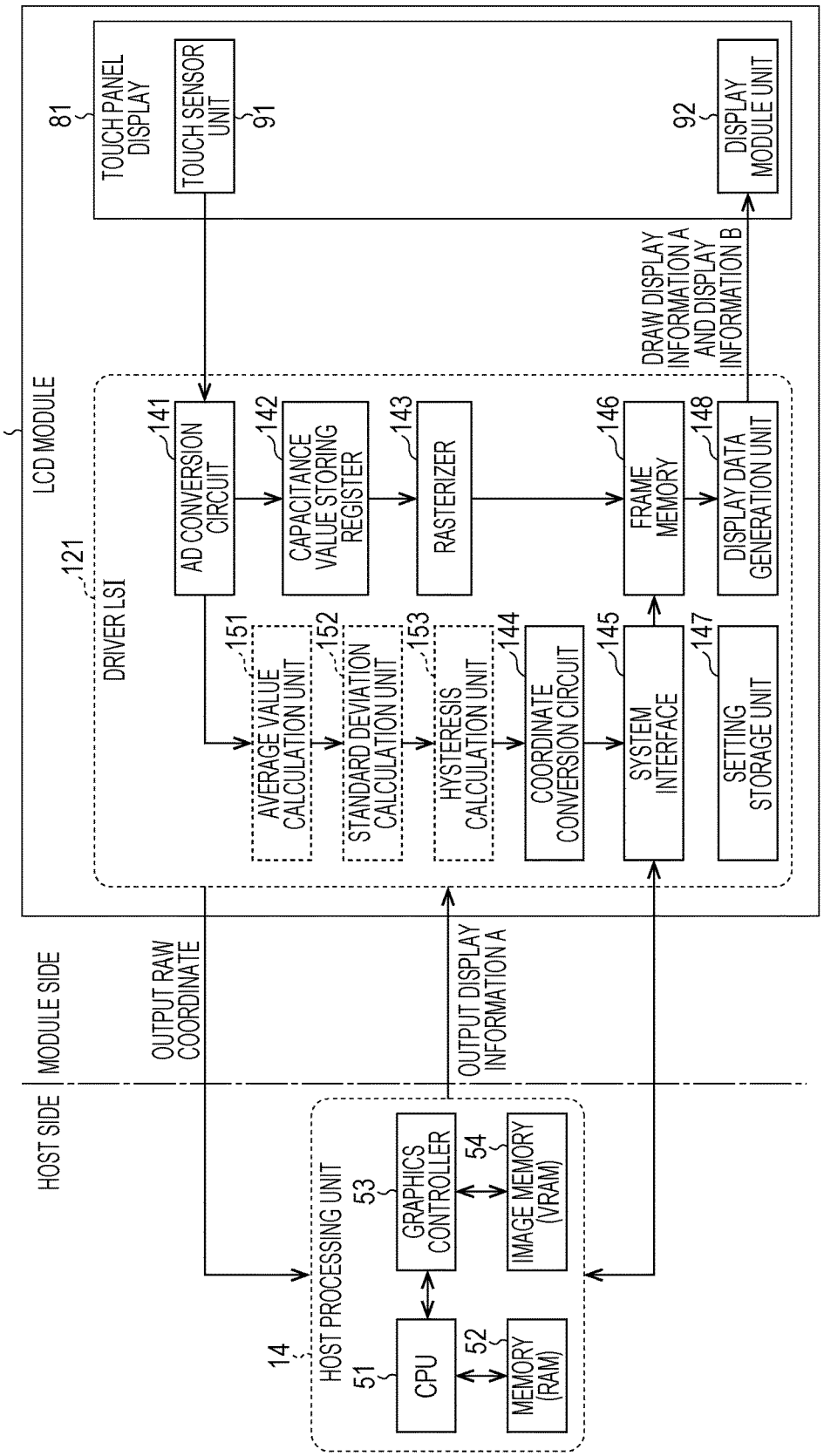
FIG. 9 is a block diagram illustrating a detailed configuration of the driver LSI of FIG. 8.

FIG. 9 is a block diagram illustrating the functions of the driver LSI 21 of the third embodiment in more detail. With reference to FIG. 9, display control using the driver LSI 121 will be further described.

The driver LSI 121 includes at least an AD conversion circuit 141, a capacitance value storing register 142, a rasterizer 143, a frame memory 146, a coordinate conversion circuit 144, a system interface 145, a setting storage unit 147, and a display data generation unit 148.

For example, the AD conversion circuit 141, the capacitance value storing register 142, and the rasterizer 143 correspond to the functions of the detection circuit 102 of FIG. 8.

Further, the coordinate conversion circuit 144, the system interface 145, the frame memory 146, the setting storage unit 147, and the display data generation unit 148 correspond to the coordinate conversion circuit 103, the timing controller 113, the memory 112, the setting storage unit 114, and the LCD driver 111 of FIG. 8, respectively. An average value calculation unit 151, a standard deviation calculation unit 152, and a hysteresis calculation unit 153 correspond to the coordinate correction circuit 104 of FIG. 8.

It should be noted that in FIG. 9, the part corresponding to the touch panel driver 101 of FIG. 8 is omitted.

The AD conversion circuit 141 detects an analog sensor signal from the touch sensor unit 91, AD-converts it to a digital sensor signal, and supplies it to the capacitance value storing register 142 and the average value calculation unit 151. If the average value calculation unit 151, the standard deviation calculation unit 152, and the hysteresis calculation unit 153 are omitted, a digital sensor signal is supplied to the coordinate conversion circuit 144 rather than the average value calculation unit 151.

The capacitance value storing register 142 stores a digital electrostatic capacitance value which is a sensor signal supplied from the AD conversion circuit 141. The rasterizer 143 converts (rasterizes) the digital electrostatic capacitance value stored in the capacitance value storing register 142 into raster format, and stores it in the frame memory 146.

The coordinate conversion circuit 144 calculates a two-dimensional coordinate position on the display to which the user touched, based on the digital electrostatic capacitance value as a sensor signal supplied from the AD conversion circuit 141.

The system interface 145 outputs the two-dimensional coordinate position indicating the touched position by the user, supplied from the coordinate conversion circuit 144, to the host processing unit 14 of a personal computer or the like via a system bus not shown.

The system interface 145 stores various types of control information supplied from the host processing unit 14, in the internal resister (not shown) in the driver LSI 121.

Further, the system interface 145 obtains display data to be displayed on the display of the display module unit 92, supplied from the host processing unit 14, and stores it in the frame memory 146.

The frame memory 146 has a memory capacity capable of holding display data of one screen.

When display data is supplied from the rasterizer 143 or the system interface 145, the frame memory 146 stores the supplied display data in a manner of rewriting the currently held display data. The display data held by the frame memory 146 is read at optimum timing by the display data generation unit 148.

The digital electrostatic capacitance value, supplied from the rasterizer 143, is converted to display data of the display information B in which the touched position is indicated in a given color, based on the setting information stored in the setting storage unit 147, and is stored in the frame memory 146.

Meanwhile, from the system interface 145, display data of the display information A generated by performing calibration operation and the like on the two-dimensional coordinate position, indicating the touched position by the user, by the CPU 51 of the host processing unit 14 is supplied, and is stored in the frame memory 146.

The setting storage unit 147 stores setting information specifying a drawing color to be used when the touched position on the display is displayed as the display information B.

The display data generation unit 148 reads display data stored in the frame memory 146, and by applying a voltage corresponding to the display data to drain lines (data lines) of the display module unit 92, drives (transistors in) the respective pixels of the display module unit 92. Thereby, an image (display information) corresponding to the display data stored in the frame memory 146 is displayed on the display of the display module unit 92.

In the case where the average value calculation unit 151, the standard deviation calculation unit 152, and the hysteresis calculation unit 153 are provided, by calculating an average, a standard deviation, and a hysteresis of each electrostatic capacitance value indicating a touch by the user, corrected coordinate values, in which the touched position by the user is corrected accurately, are calculated and supplied to the coordinate conversion circuit 144.

Figure 10:
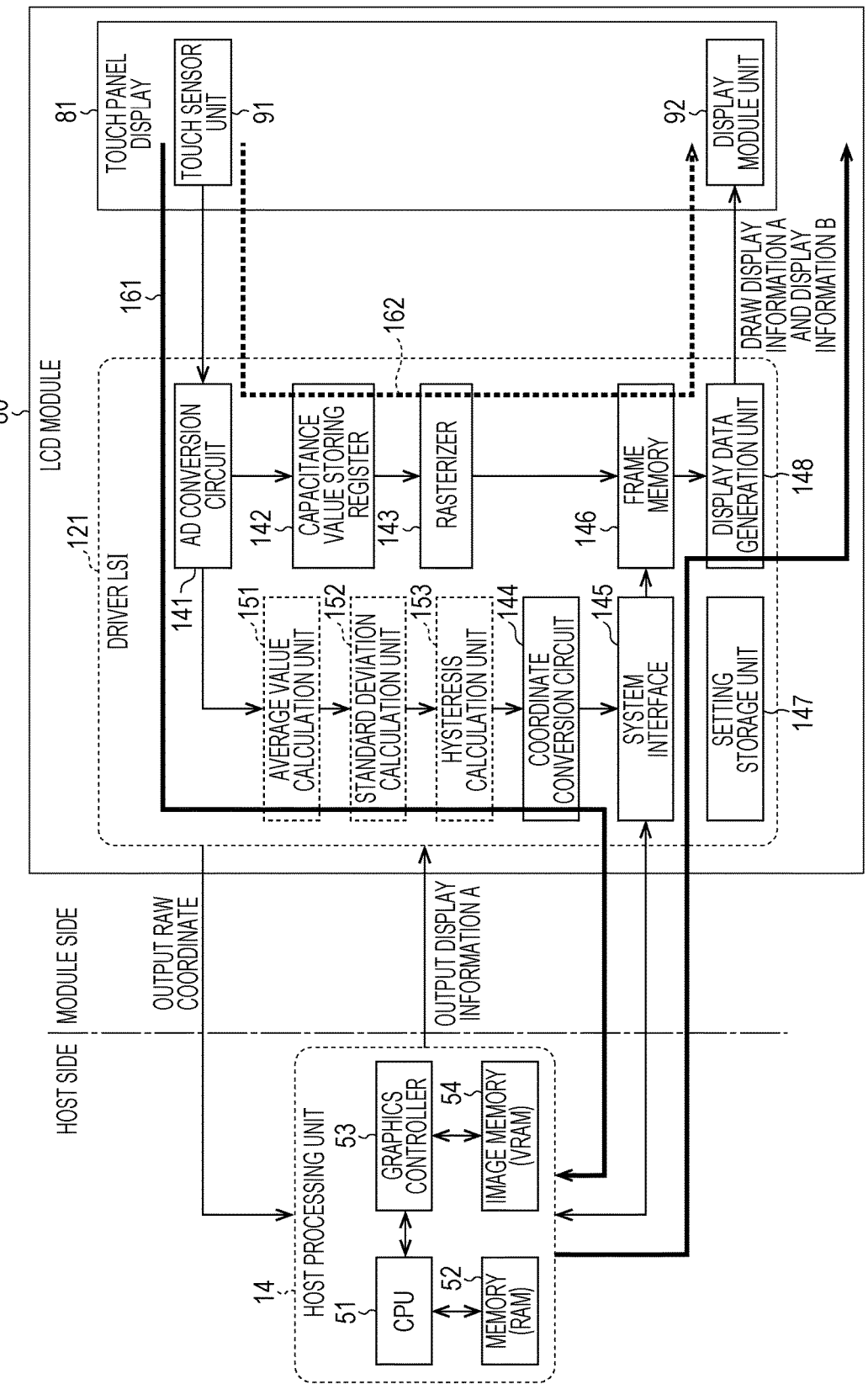
FIG. 10 is a drawing illustrating paths of display control of the present technology.

In the third embodiment of the LCD module 80 configured as described above, a sensor signal detected by the touch sensor unit 91 is displayed on the display as the display information B through a path 162 shown by a thick broken line in FIG. 10, and also displayed on the display as the display information A through a path 161 shown by a thick solid line in FIG. 10.

The path 161 shown by the thick solid line is a path routed via the CPU 51 and the graphics controller 53 of the host processing unit 14, and the path 162 shown by the thick broken line is a path processed inside the driver LSI 121 not via the host processing unit 14. In other words, the path 161 of the thick solid line is a path having a large processing amount (operation amount) for generating display information, in which calibration operation and the like are performed on the sensor signal detected by the touch sensor unit 91, and the path 162 of the thick broken line is a path having a small processing amount (operation amount) for generating display information from the sensor signal detected by the touch sensor unit 91.

Before drawing the accurate display information A on which calibration operation and the like have been performed, by drawing the display information B generated by the path 162 not via the host-side processor, it is possible to reduce the delay in time from the time when the user performs a touch input until it is drawn on the touch panel display 81.

<Display Control Processing of Display Information B>

Referring to the flowchart of FIG. 11, description will be given on display control processing to display the display information B, corresponding to a touch input by a user, on the display of the display module unit 92 using the path 162 not via the host-side processor.

First, at step S1, the AD conversion circuit 141 detects an analog sensor signal indicating an electrostatic capacitance value from the touch sensor unit 91, AD converts it to a digital signal, and supplies 1a it to the capacitance value storing register 142. The capacitance value storing register 142 stores the digital sensor signal indicating an electrostatic capacitance value supplied from the AD conversion circuit 141.

At step S2, the rasterizer 143 converts the digital electrostatic capacitance value, stored in the capacitance value storing register 142, into raster format, and stores it in the frame memory 146. The digital electrostatic capacitance value, supplied from the rasterizer 143, is converted to display data of the display information B in which the touched position is indicated in a given color, based on the setting information stored in the setting storage unit 147, and is stored in the frame memory 146.

At step S3, the display data generation unit 148 reads display data stored in the frame memory 146, and drives (transistors in) the respective pixels of the display module unit 92.

Through the above-described processing, a given position on the display touched by the user of the display image displayed on the display of the display module unit 92, is displayed in a given color as the display information B.

<Display Control Processing of Display Information A>

Next, with reference to the flowchart of FIG. 12, description will be given on display control processing to display the display information A, corresponding to a touch by a user, on the display of the display module unit 92 using the path 161 routed via the host-side processor.

First, at step S11, the AD conversion circuit 141 detects an analog sensor signal indicating an electrostatic capacitance value from the touch sensor unit 91, AD-converts it to a digital signal, and supplies it to the coordinate conversion circuit 144. The processing of step S11 is performed together with the processing of step S1 in FIG. 11 as one processing step.

It should be noted that in the case of performing calibration operation, calibration operation is performed by the average value calculation unit 151 or the like on the sensor signal from the AD conversion circuit 141, and the sensor signal after the calibration operation is supplied to the coordinate conversion circuit 144.

At step S12, the coordinate conversion circuit 144 calulates the two-dimensional coordinate position on the display touched by the user, based on the digital electrostatic capacitance value as a sensor signal supplied from the AD conversion circuit 141.

At step S13, the system interface 145 outputs the two-dimensional coordinate position indicating the touched position by the user, supplied from the coordinate conversion circuit 144, to the host processing unit 14 via a system bus not shown.

At step S14, the system interface 145 obtains display data of the display information A generated by performing operation such as calibration on the two-dimensional coordinate position indicating the touched position by the user supplied to the host processing unit 14, and stores it in the frame memory 146.

At step S15, the display data generation unit 140 reads the display data stored in the frame memory 146, and drives (transistors in) the respective pixels of the display module unit 92. This processing of step S15 and the processing of step S3 described above are the same processing.

Figure 12:
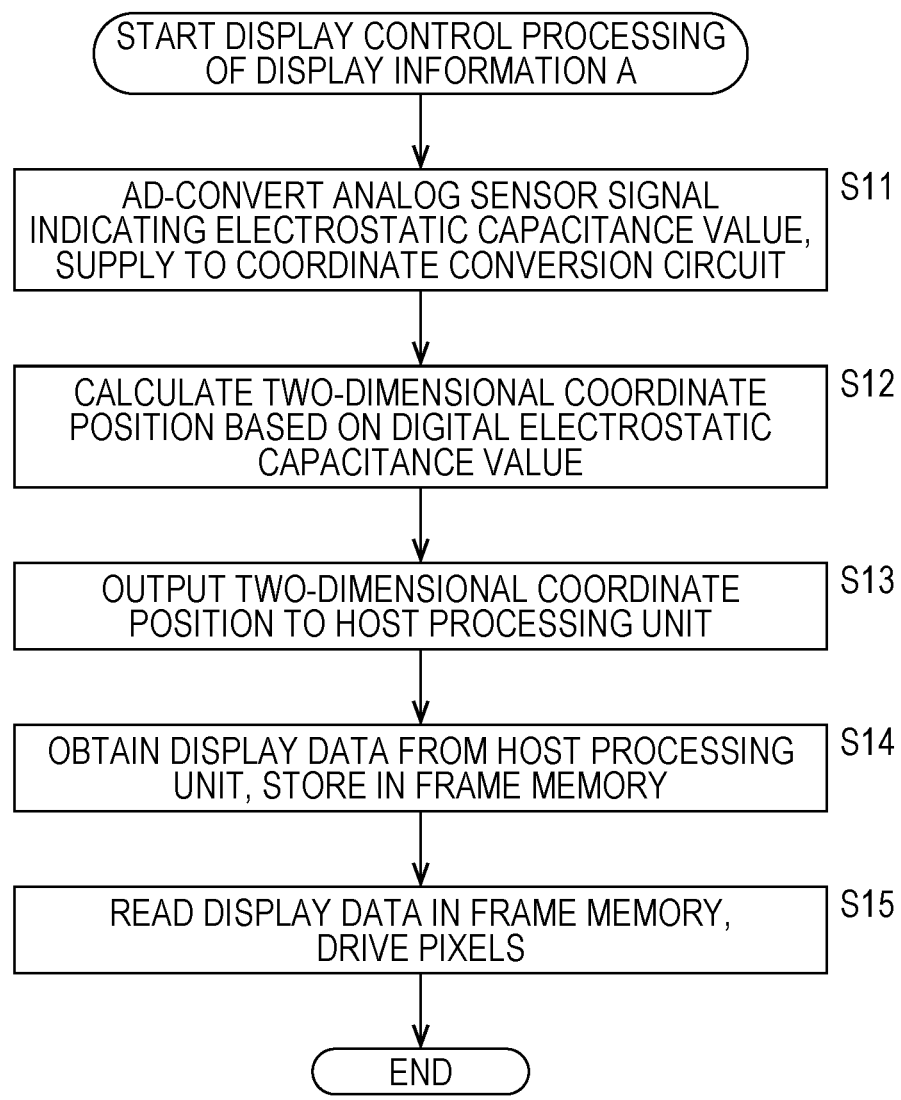
FIG. 12 is a flowchart explaining display control processing via a host-side processor.

According to the processing of FIG. 12, a given position on the display touched by the user is displayed in a given color as the display information A, with the display control by the CPU 51 and the graphics controller 53 on the host side.

In the conventional LCD module 10 illustrated in FIG. 1, only the display control processing to display the display information A using the path 161 via the host-side processor, described with reference to FIG. 12, is performed.

Figure 11:
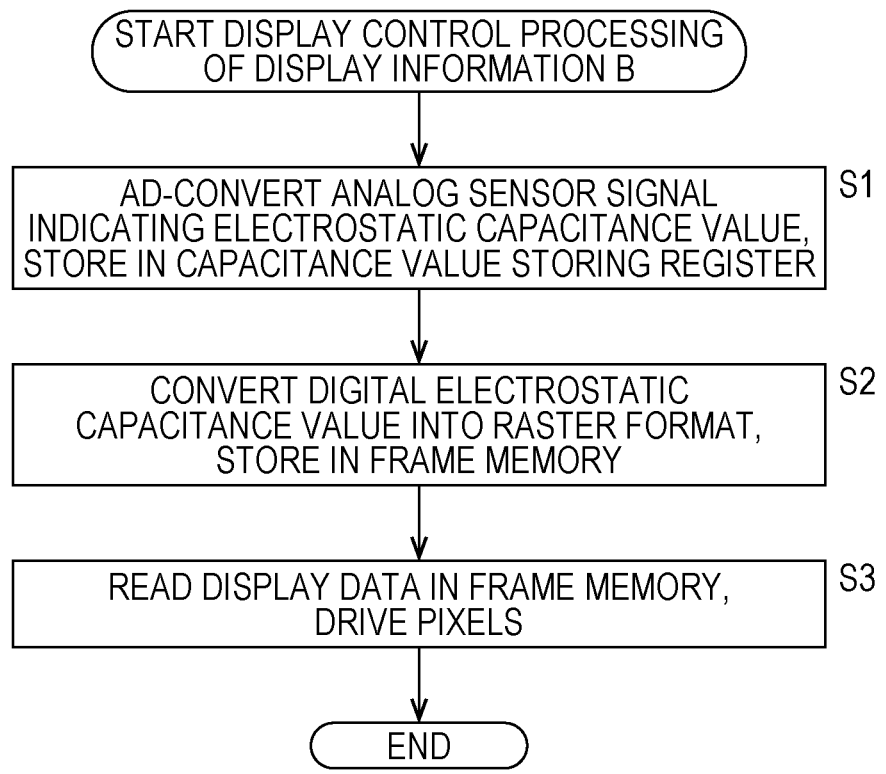
FIG. 11 is a flowchart explaining display control processing not via a host-side processor.

On the other hand, in the LCD module 80 to which the present technology is applied, the display control processing to display the display information B using the path 162 not via the host-side processor, described with reference to FIG. 11, is further performed.

As the display control processing using the path 162 is processing not via the host-side processor, it is possible to perform displaying faster than the display control processing using the path 161, reacting immediately to detection of a touch. Thereby, it is possible to shorten the time lag from the time when a touch by the user is detected until it is drawn (displayed) on the display, and to reduce a delay in drawing felt by the user.

Figure 13:
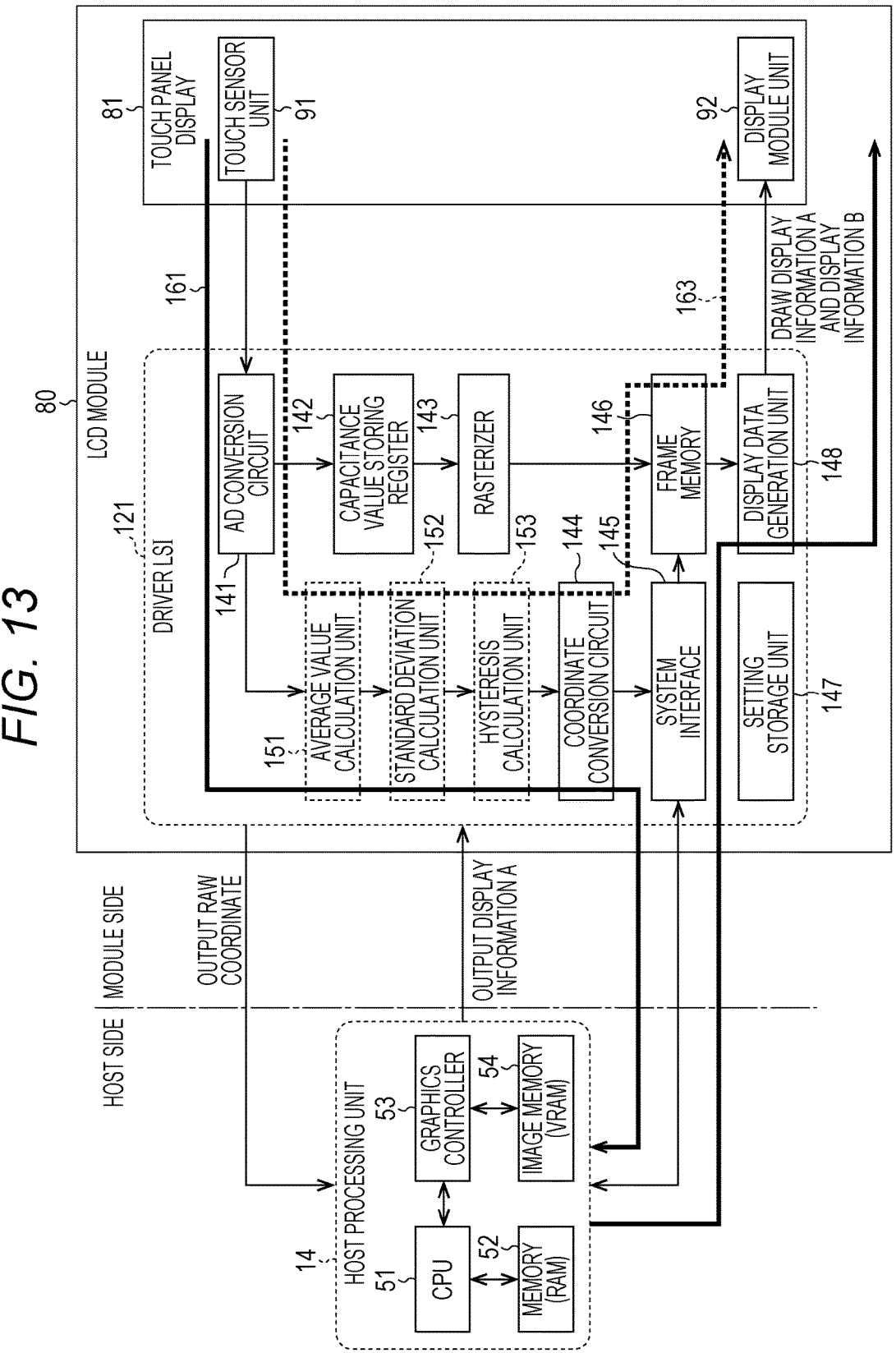
FIG. 13 is a drawing illustrating paths of another display control of the present technology.

It should be noted that a path not via the host-side processor may be a path 163 shown by a thick broken line in FIG. 13, rather than the path 162 described above. This means that two-dimensional coordinate values obtained from an AD-converted digital sensor signal may be generated and displayed as display data of the display information B.

<5. Exemplary Configuration of Personal Computer>

Figure 14:
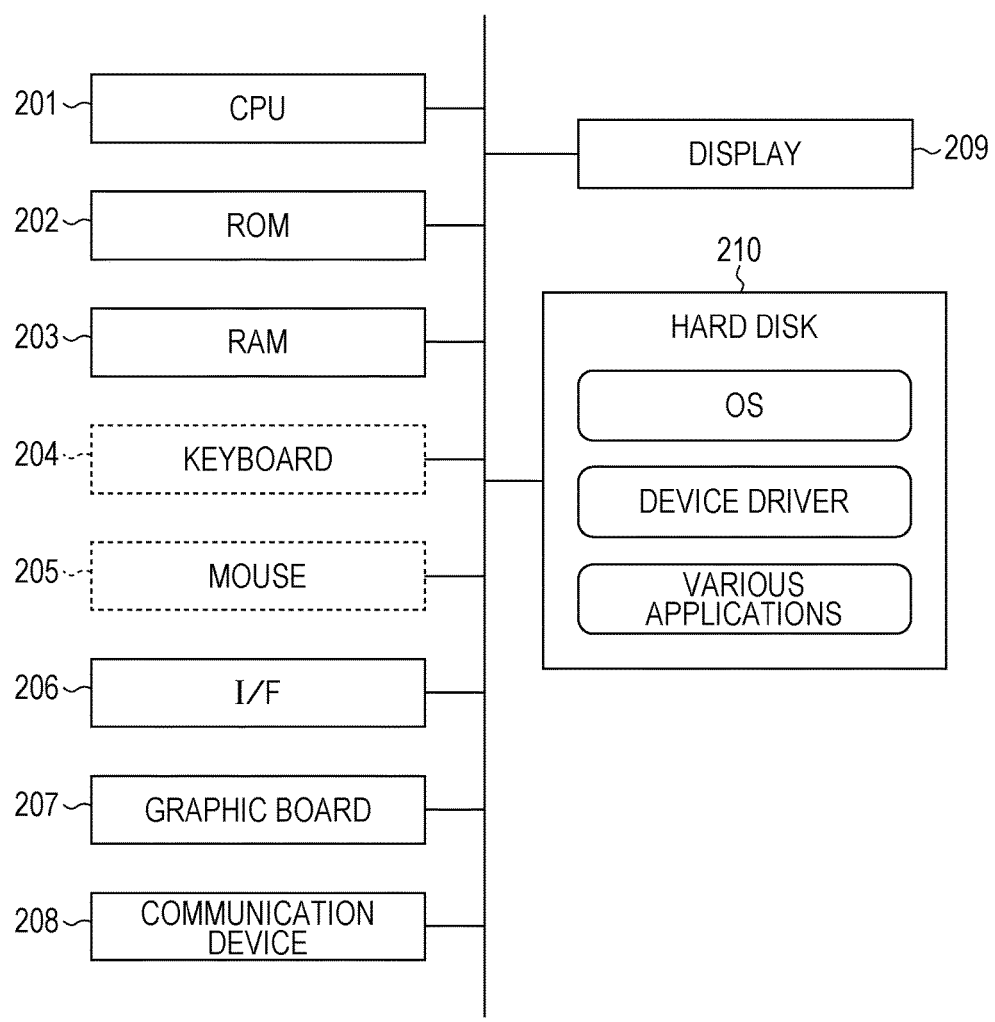
FIG. 14 is a block diagram of a computer to which the present technology is applied.
Figure 15:
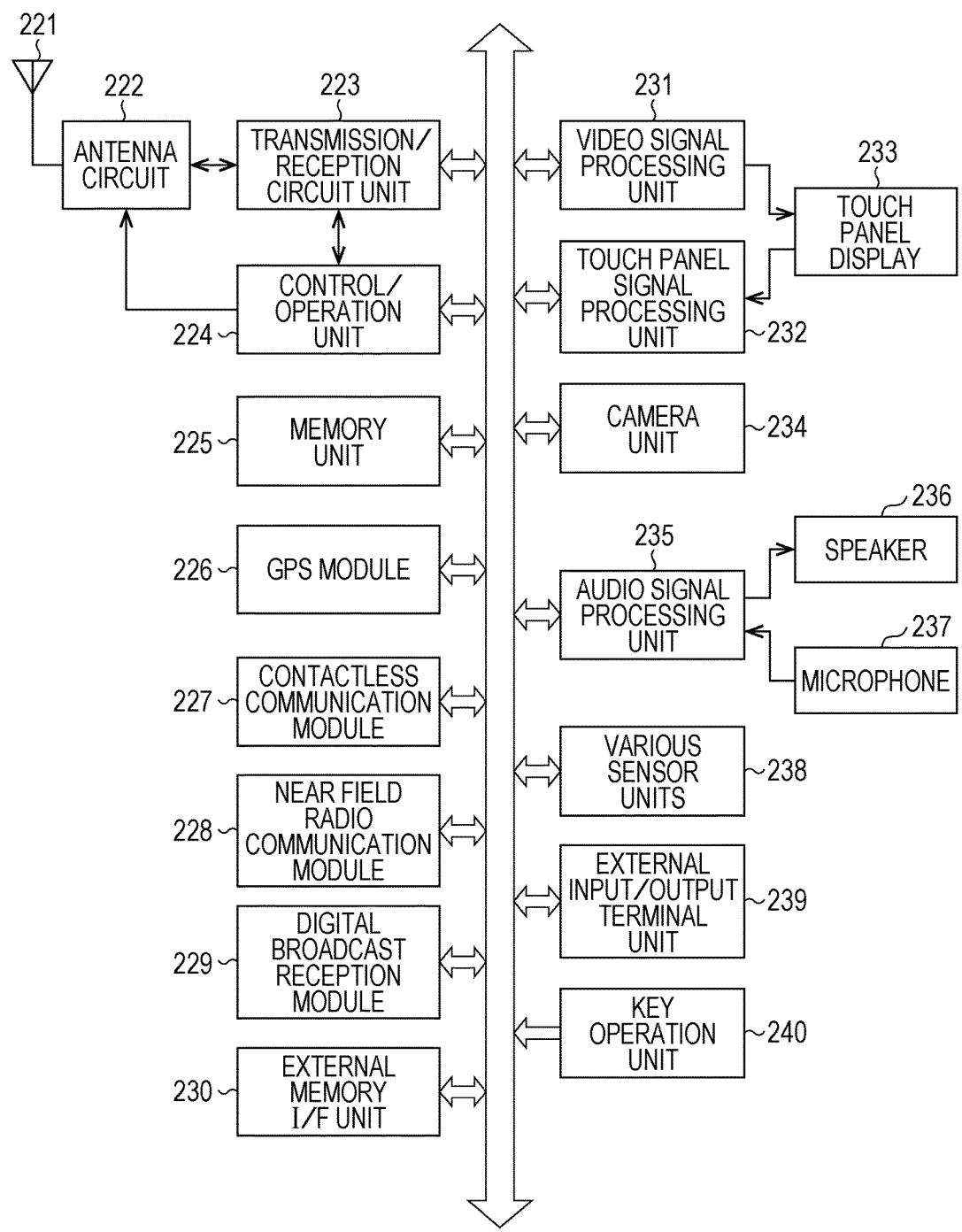
FIG. 15 is a block diagram of a high-functional mobile phone terminal to which the present technology is applied.

The present technology is applicable to electronic devices having a touch panel display of an internal type such as a computer, a mobile phone terminal, a tablet terminal, a portable game console, and a portable audio/video player. FIG. 14 and FIG. 15 illustrate the overall configurations of a computer and a mobile telephone set.

FIG. 14 is a block diagram of a computer (personal computer) including the LCD module 80 to which the present technology is applied and the host processing unit 14 which controls it.

A CPU 201 controls the entire system of the computer according to various types of programs. A ROM 202 stores a boot program, operation parameters, and the like used by the CPU 201. A RAM 203 temporarily stores programs to be used for execution by the CPU 201, parameters which vary appropriately in the execution, and the like.

The computer also includes a keyboard 204 for inputting characters, numbers, various types of instructions, and the a mouse 205 for cursor movement and range selection, and the like, and an interface (I/F) 206 for connection with external devices such as a controller, a scanner, and a printer. It should be noted that if the computer is of the tablet type rather than the laptop or the terminal type, the keyboard 204 and the mouse 205 are omitted.

Further, the computer also includes a graphic board 207 which controls display of images, a communication device 208 configured of a network card, a modem, or the like for connection with networks, a display 209 having a touch panel function, and a hard disk 210 as a data storage device. The hard disk 210 stores an operating system (OS), device drives for various types of devices, and various types of application programs such as word processor and spreadsheet software.

The graphics controller 53 and an image memory 54 of FIG. 4 are arranged inside the graphic board 207 of FIG. 14, and the LCD module 80 corresponds to the display 209 of FIG. 14.

<6. Exemplary Configuration of Mobile Phone Terminal>

FIG. 15 is a block diagram of a high-function mobile phone terminal (smartphone) including the LCD module 80 to which the present technology is applied and the host processing unit 14 which controls it.

In FIG. 15, a communication antenna 221 is a built-in antenna for example, and performs transmission and reception of calls and e-mails over a mobile phone network and a public radio communication network, downloading of various types of application programs including an information input control program based on touch detection described above, transmission and reception of signal radio waves for communication with the Internet, and the like.

An antenna circuit 222 is configured of an antenna switch, a matching circuit, a filter circuit, and the like, and a transmission/reception circuit unit 223 performs frequency conversion, modulation, demodulation, and the like of transmission/reception signals over a mobile phone network and a public radio communication network.

A speaker 236 is used for playing music, outputting receiving sound, outputting ringer (ringtone), and the like. A microphone 237 is used for collecting outside sound, collecting speaking sound, and the like. An audio signal processing unit 235 is configured of an amplifier circuit for the speaker 236, an amplifier circuit for the microphone 237, a decompression decoding circuit which performs decompression decoding on compression-coded audio data supplied from a control/operation unit 224, a digital/analog conversion circuit which converts a audio data after the decompression decoding to an analog audio signal, an analog/digital conversion circuit which converts an analog audio signal input from the microphone 237 to digital audio data, an compression coding circuit which performs compression coding on be digital audio data, and the like.

A video signal processing unit 231 is configured of a decompression decoding circuit which performs decompression decoding on compression-coded video data supplied from the control/operation unit 224, a display panel drive circuit which allows digital video after the decompression decoding and digital broadcast video received by a digital broadcast reception module 229, described below, and the like to be displayed on a touch panel display 233.

Further, the video signal processing unit 231 also generates display data for displaying a desktop image and various types of menu images supplied from the control/operation unit 224, a virtual touch area image corresponding to a position on the touch panel display 233, and the like, and allows those images to be displayed on the touch panel display 233.

The touch panel display 233 includes a touch sensor unit capable of detecting an input operation by a user. A touch panel signal processing unit 232 measures a touch detection position, a touch locus, a touch continuing time, a touch time interval, and the like from the touch panel display 233, and transmits the measured data to the control/operation unit 224 as touch detection data. It should be noted that a touch input to the display surface of the touch panel display 233 may be made by a stylus accompanying the terminal, other than a finger of the user or the like. Further, the touch panel display 233 and the touch panel signal processing unit 232 support so-called multi-touch.

A key operation unit 240 is configured of hard keys provided on the casing of the mobile phone terminal, peripheral circuits, and the like. The key operation unit 240 converts hard key pushing operation by a user to electric signals, amplifies and converts the operation input signals from analog to digital, and transmits the operation input data after the analog to digital conversion to the control/operation unit 224.

An external input/output terminal unit 239 is configured of, for example, a connector for connection on a cable and an interface circuit for external data communications which are used for performing data communications through a cable, a charging terminal and an interface circuit for charging used for charging the internal battery through a bower supply cable or the like, and the like.

Further, an external memory I/F unit 230 is configured of an external memory slot to/from which a storage medium such as an external memory is attached or detached, an interface circuit for the external memory data communications, and the like.

A near field radio communication module 228 is configured of a communication antenna for near field radio wave such as a wireless LAN and the Bluetooth (registered trademark), and a near field radio communication circuit.

The digital broadcast reception module 229 is configured of an antenna and a tuner for receiving so-called digital television broadcasting, digital radio broadcasting, and the like. The digital broadcast reception module 229 is able to receive not only digital broadcasting of one channel but also digital broadcasting of multiple channels simultaneously. Further, the digital broadcast reception module 229 is also able to receive data multiplexed on digital broadcasting. It should be noted that digital broadcast data received by the digital broadcast reception module 229 is able to be stored (that is, recorded) in a memory unit 225 or the like after being compressed or the like by the control/operation unit 224, for example.

A camera unit 234 is configured of an imaging element for capturing still images and moving images, an optical system and the like and peripheral circuits thereof, a light drive circuit for emitting photographing auxiliary light, and the like. Still image data and moving image data, when captured by the camera unit 234, are transmitted to the video signal processing unit 231 as preview video data. Thereby, at the time of capturing by the camera, preview video is displayed on the touch panel display 233. Further, in the case of recording still image data and moving image data captured by the camera unit 234, the captured still image data and moving image data are transmitted to the control/operation unit 224 and compressed, and then stored in the memory unit 225 or a storage medium connected with the external memory I/F unit 230.

A contactless communication module 227 performs contactless communications used in so-called RFID (Radio Frequency-Identification), a contactless-type IC card, and the like, via a contactless communication antenna.

A GPS (Global Positioning System) module 226 includes a GPS antenna, and obtains the latitude and the longitude of the current position of the own terminal using GPS signals from a GPS geodetic satellite. GPS data (information representing latitude and longitude) obtained by the GPS module 226 is transmitted to the control/operation unit 224. Thereby, the control/operation unit 224 is able to know the current position and movement of the own terminal.

Various types of sensor units 238 are configured of various types of detection sensors such as a terminal state detection sensor for detecting the state of a mobile phone terminal, and peripheral circuits thereof. The various types of sensor units 233 include a tilt sensor, an acceleration sensor, an azimuth sensor, a temperature sensor, a humidity sensor, an illuminance sensor, and the like, for example. Detection signals from the various types of sensor units 238 are transmitted to the control/operation unit 224. Thereby, the control/operation unit 224 is able to know the state (tilt, acceleration, azimuth, temperature, humidity, illuminance, and the like) of the mobile phone terminal.

The memory unit 225 is configured of a built-in memory provided inside the terminal and an attachable/detachable card-type memory. As the attachable/detachable card-type memory, a card storing so-called SIM (Subscriber Identity Module) information or the like may be used. The built-in memory is configured of ROM (Read Only Memory) and RAM (Random Access Memory). The ROM stores an OS (Operating System), control programs for controlling respective units by the control/operation unit 224, various types of initial setting values, dictionary data, character estimation conversion dictionary data, various types of sound data, various types of application programs, and the like. This ROM includes a rewritable ROM such as NAND-type flash memory or EEPROM (Electrically Erasable Programmable Read-Only Memory), and is configured to be able to save e-mail data, data of a telephone book and a mail address book, data of still image and moving image content, other various types of user setting values, and the like. The RAM stores data from time to time as a work area and a buffer area for performing various types of data processing by the control/operation unit 224.

The control/operation unit 224 is configured of a CPU (Central Processing Unit), and controls respective units such as the transmission/reception circuit unit 223, the video signal processing unit 231, the audio signal processing unit 235, the GPS module 226, the contactless communication module 227, the near field radio communication module 228, the digital broadcast reception module 229, the external memory I/F unit 220, the camera unit 234, the various types of sensor units 238, the external input/output terminal unit 239, the key operation unit 240, and the touch panel signal processing unit 222, and performs various types of operation as needed. Further, the control/operation unit 224 executes control programs and various types of application programs stored in the memory unit 225.

Besides, the mobile phone terminal is equipped with respective components which are provided to a typical mobile phone terminal such as a watch unit which measures time periods and time, a battery which supplies power to the respective units, and a power management IC which controls the power.

<7. Exemplary Variations>
<First Exemplary Variation>

In the above-described embodiment, an example has been described in which when a touch by a user is detected in the touch panel display 81, the display information B processed inside the LCD module 80, not via the host-side processor, is displayed before the display information A, via the host-side processor, is displayed. Hereinafter, description will be given on an exemplary variation (exemplary application) in the case of displaying the display information B inside the LCD module 80, not via the host-side processor.

Figure 16:
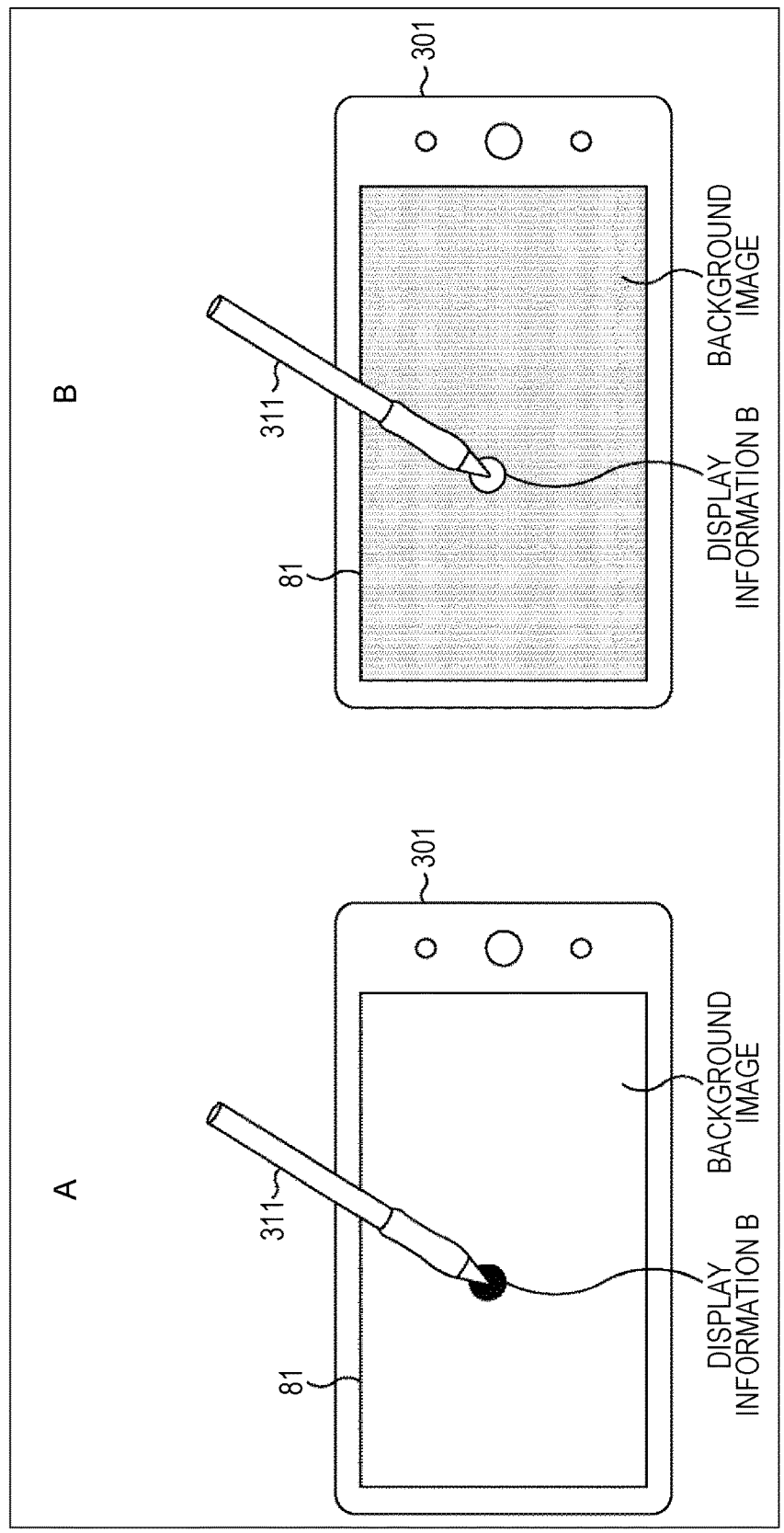
FIG. 16 is a drawing explaining a first exemplary variation of the present technology.

FIG. 16 illustrates an exemplary display of the touch panel display 81 corresponding to a first exemplary variation.

In the case where a touch by a user is detected in the touch panel display 81 and sensor data corresponding to the touched position is supplied from the detection circuit 102 of the driver IC 82 to the driver IC 83, the driver IC 83 automatically determines (changes) the drawing color of the display information B according to the color (background color) of the display image, and draws the display information B. For example, the driver IC 83 determines a color in contrast with the background color (complementary color) to be the drawing color of the display information B and draws it.

A of FIG. 16 illustrates an example in which when a white background image is displayed on the touch panel display 81 of a mobile phone terminal 301, the driver IC 83 draws a touched position where a user touched with a stylus 311 in black, as the display information B.

B of FIG. 16 illustrates an example in which when a black background image is displayed on the touch panel display 81 of the mobile phone terminal 301, the driver IC 83 draws a touched position where a user touched with the stylus 311 in white, as the display information B.

<Second Exemplary Variation>

Figure 17:
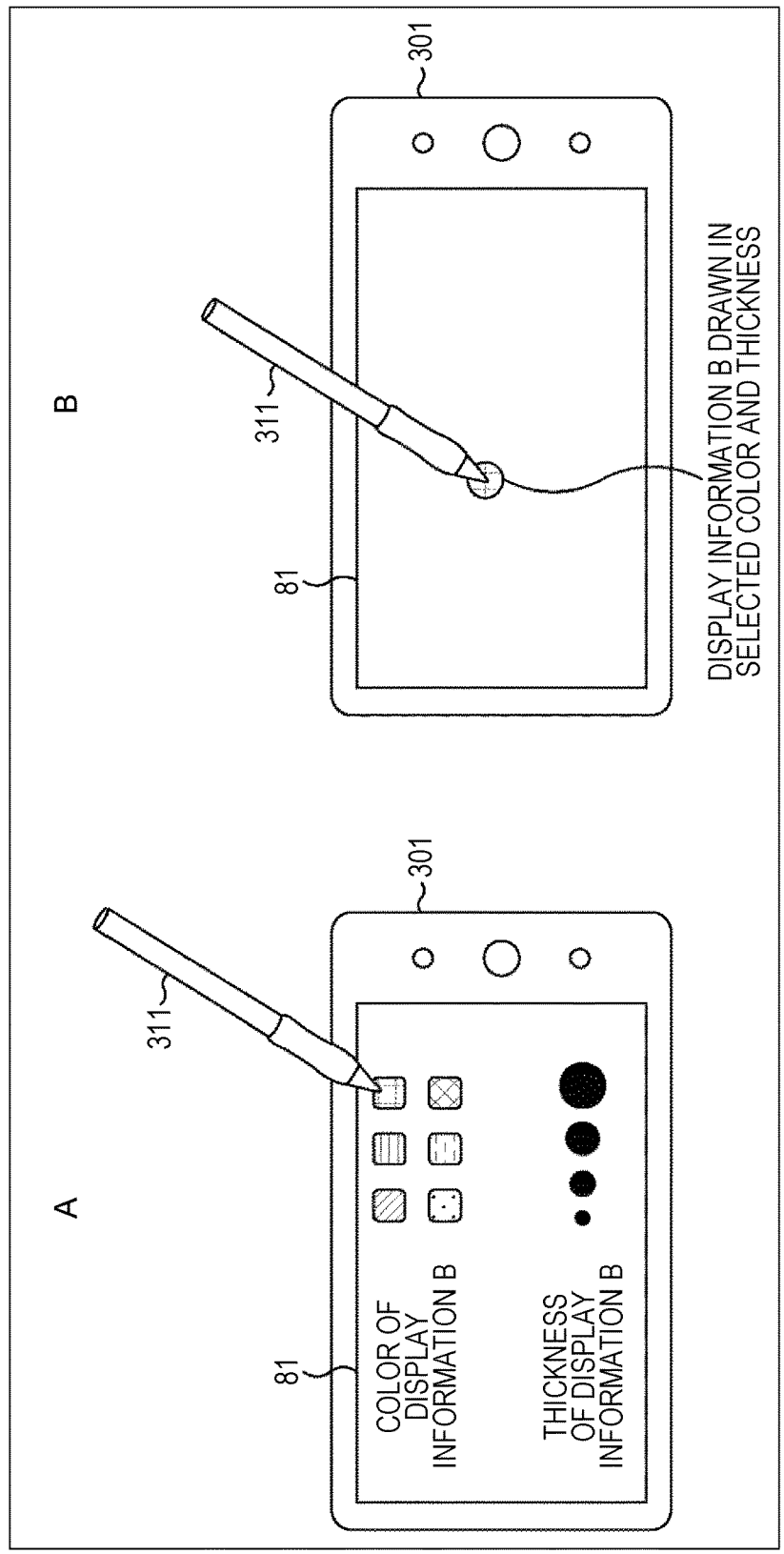
FIG. 17 is a drawing explaining a second exemplary variation of the present technology.

FIG. 17 illustrates an exemplary display of the touch panel display 81 according to a second exemplary variation.

The second exemplary variation is an example in which colors and sizes for drawing the display information B are set in beforehand, and the display information B is drawn in a color and a size having been set.

A of FIG. 17 illustrates an example of a setting screen for setting a color and a size for drawing the display information B.

The setting screen, as illustrated in A of FIG. 17, is displayed on the touch panel display 81, and a user selects a color and a size for drawing the display information B. The color and the size selected by the user are saved in the setting storage unit 114 as setting information. It should be noted that in the setting screen of A of FIG. 17, color differences of the display information B are expressed in different patterns.

As illustrated in B of FIG. 17, when the user touches a given position on the touch panel display 81 with the stylus 311, the driver IC 83 draws the display information B in the color and the size indicated by the setting information stored in the setting storage unit 114. Thereby, it is possible to draw the display information B in any color and size selected by the user.

<Third Exemplary Variation>

Figure 18:
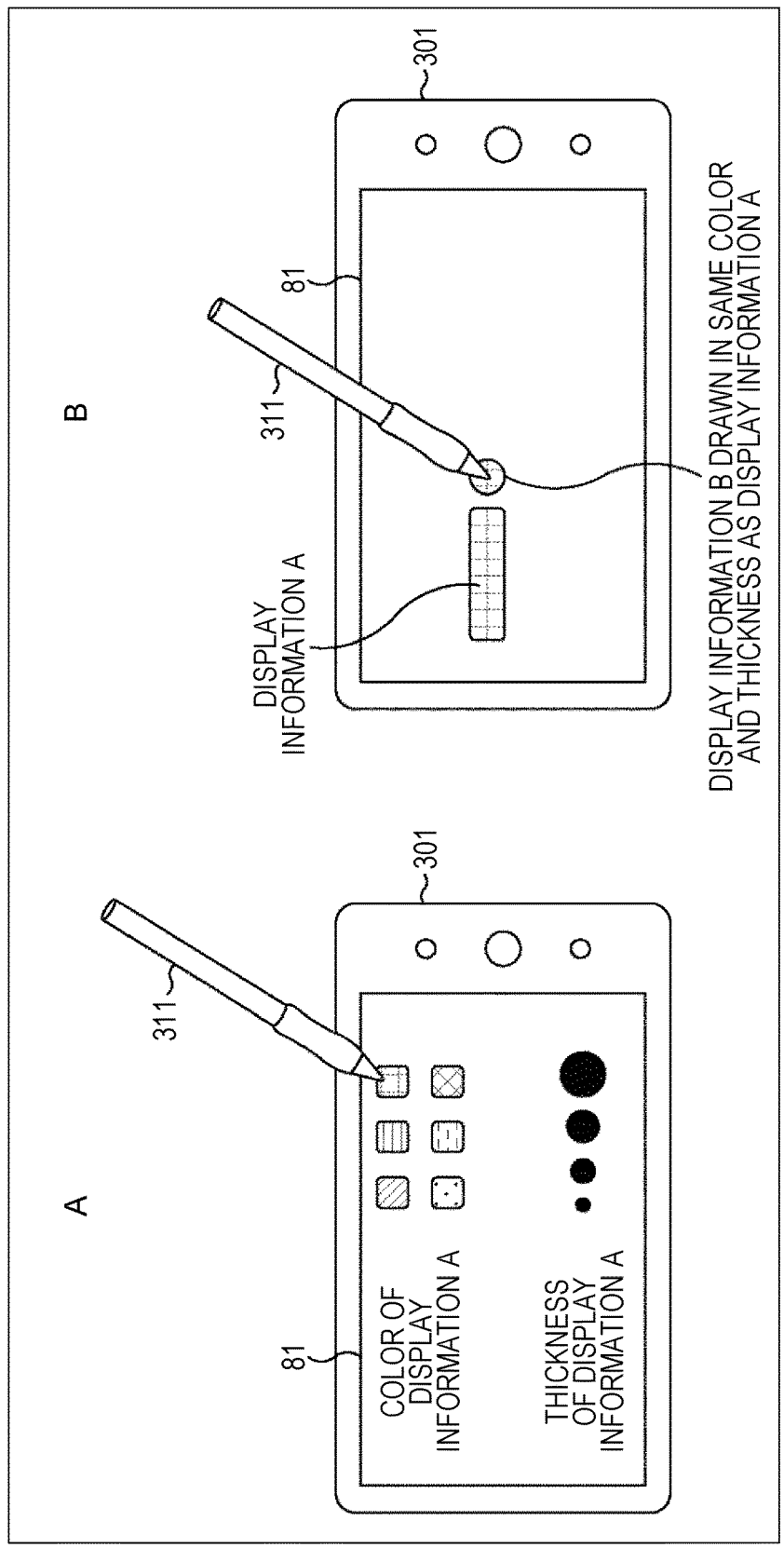
FIG. 18 is a drawing explaining a third exemplary variation of the present technology.

FIG. 18 illustrates an exemplary display of the touch panel display 81 corresponding to a third exemplary variation.

The third exemplary variation is an example in which in an application for drawing characters and pictures using the stylus 311 or the like, if colors and sizes for drawing characters and pictures are set, the display information B is drawn using the set color and the size.

A of FIG. 18 illustrates an example of a setting screen for setting a color and a size when drawing a character or a picture in an application for drawing characters and pictures. As a color and a size set here are reflected on the display image generated by the application executed by the CPU 51 of the host processing unit 14, they correspond to the color and size of the display information A via the host-side processor.

As illustrated in B of FIG. 18, when a user touches a given position on the touch panel display 81 with the stylus 311, the driver IC 83 draws the display information B in the same color and the size as those set as the drawing color and the size of the display information A. Thereby, the drawing color and the size of the display information B drawn not via the host-side processor and the display information A drawn via the host-side processor are the same.

It should be noted that according to the present technology, when a character or a picture is drawn using the stylus 311, a finger, or the like, the display information B is drawn first on the touch panel display 81 and then the display information A is drawn in place of the display information B. At that time, as a method of replacing it, while it may be replaced with the display information A instantaneously, it is also possible to perform display control in such a manner that the transmittance when the display information A overlaps the display information B varies gradually so that the display information B is gradually replaced with the display information A.

<Fourth Exemplary Variation>

Figure 19:
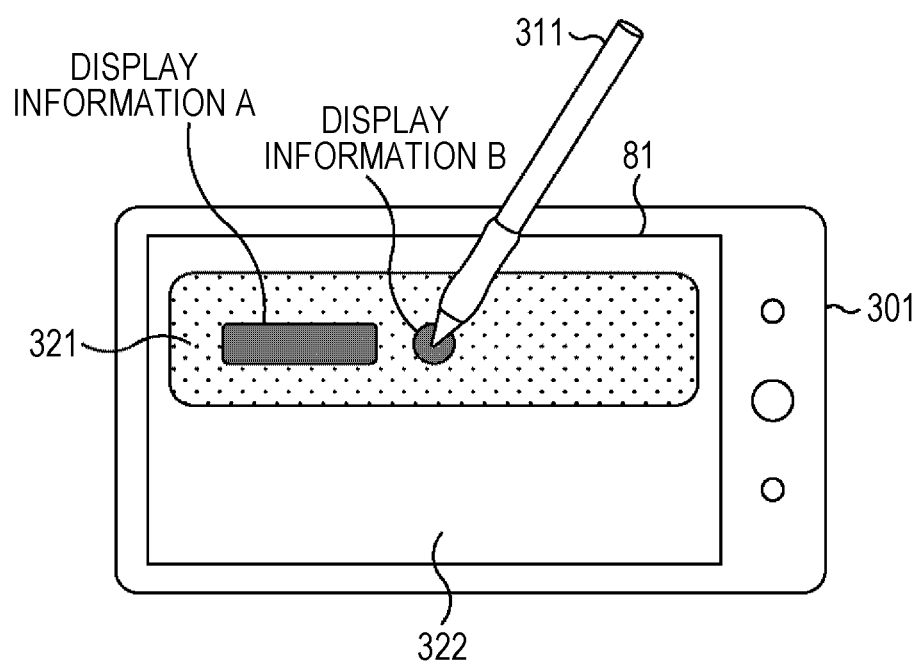
FIG. 19 is a drawing explaining a fourth exemplary variation of the present technology.

FIG. 19 illustrates an exemplary display of the touch panel display 81 corresponding to a fourth exemplary variation.

The fourth exemplary variation is an example in which a touch input area of the touch panel display 81 is divided into an area to which quick feedback is provided with respect to a touch input by a user and an area in which only the display information A is drawn, by drawing the display information A and the display information B.

For example, as for a given area 321 in the touch input area of the touch panel display 81 illustrated in FIG. 19, the driver IC 83 draws both the display information B, generated not via the host-side processor, and the display information A generated via the host-side processor. On the other hand, as for an area 322 other than the area 321, only the display information A, via the host-side processor, is drawn.

<Fifth Exemplary Variation>

Figure 20:
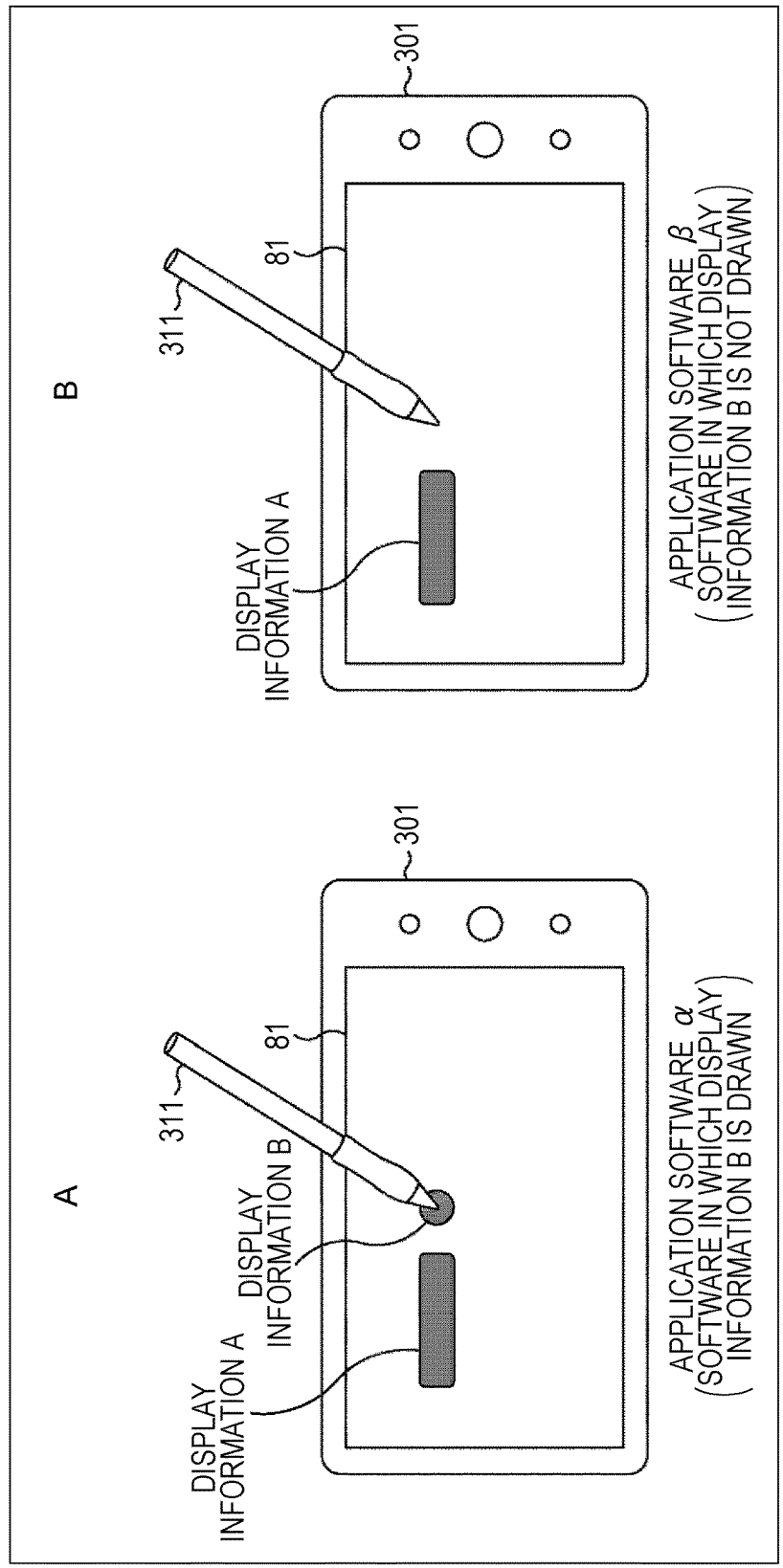
FIG. 20 is a drawing explaining a fifth exemplary variation of the present technology.

FIG. 20 illustrates an exemplary display of the touch panel display 81 corresponding to a fifth exemplary variation.

The fifth exemplary variation is an example in which whether or not to provide instantaneous feedback with respect to a touch input by a user, by drawing the display information A and the display information B, is distinguished depending on an application.

For example, while the driver IC 83 draws the display information A and the display information B in application software α as illustrated in A of FIG. 20, the driver IC 83 only draws the display information A via the host-side processor in application software β as illustrated in B of FIG. 20. The driver IC 83 is able to switch whether or not to draw the display information B by obtaining a flag representing whether or not to validate drawing of the display information B not via the host-side processor, from application software.

The exemplary variations described above may be adopted separately, or may be executed by using two or more functions together.

It should be noted that in the present description, the steps described in the flowcharts may be performed in parallel or at necessary timing when a call is made or the like, regardless of whether they are processed in a time-series manner along the described sequence or not.

The embodiments of the present technology are not limited to the embodiments described above. Various changes thereof can be made within the scope not deviating from the gist of the present technology.

For example, a mode of combining all or part of the embodiments described above may be adopted.

For example, the respective steps described in the flowcharts described above may be performed by one device or shared by a plurality of devices. Further, if one step includes a plurality of types of processing, the types of processing included in one step may be performed by one device or shared by a plurality of devices.

It should be noted that the present technology may take the configurations as described below.

(1)

A display control device including:

a display control unit that obtains first display data representing a touch input position by a user on a touch panel display, from a first processing unit through a first path, obtains second display data using the first display data from a second processing unit through a second path, the second processing unit performing display image generation processing involving a processing amount larger than a processing amount of the first processing unit, and performs control to allow first display information based on the first display data and second display information based on the second display data to be displayed on the touch panel display.

(2)

The display control device according to (1), further including a setting storage unit that stores a drawing color when the first display information is displayed using the first display data, wherein the display control unit allows the first display information to be displayed in a drawing color set in the setting storage unit, (3)

The display control device according to (1) or (2), further including a setting unit that sets a drawing color when the first display information is displayed using the first display data, wherein the setting storage unit stores the drawing color set by the setting unit.

(4)

The display control device according to any of (1) to (3), wherein the display control unit determines the drawing color of the first display information according to a background color of a display image displayed on the touch panel display, and allows the first display information to be displayed.

(5)

The display control device according to any of (1) to (4), wherein the display control unit determines a drawing setting of the first display information according to a drawing setting of the second display information, and allows the first display information to be displayed.

(6)

The display control device according to any of (1) to (5), wherein the display control unit gradually changes transmittances of the first display information and the second display information to thereby replace the first display information with the second display information.

(7)

The display control device according to any of (1) to (6), wherein the display control unit distinguishes between a case in which both the first display information and the second display information are displayed and a case in which only the second display information is displayed, depending on a display area of the touch panel display.

(8)

The display control device according to any of (1) to (7), wherein the display control unit distinguishes between a case in which both the first display information and the second display information are displayed and a case in which only the second display information is displayed, depending on application.

(9)

The display control device according to any of (1) to (8), wherein the first display data is sensor data of the touch input position.

(10)

The display control device according to any of (1) to (9), wherein the first display data is data after calibration operation has been performed on sensor data of the touch input position.

(11)

The display control device according to any of (1) to (10), further including:

the touch panel display;

a microphone that collects a sound; and a speaker that outputs a sound.

(12)

A display control method including obtaining first display data representing a touch input position by a user on a touch panel display, from a first processing unit through a first path, obtaining second display data using the first display data from a second processing unit through a second path, the second processing unit performing display image generation processing involving a processing amount larger than a processing amount of the first processing unit, and performing control to allow first display information based on the first display data and second display information based on the second display data to be displayed on the touch panel display.

(13)

A program for causing a computer to perform processing of obtaining first display data representing a touch input position by a user on a touch panel display, from a first processing unit through a first path, obtaining second display data using the first display data from a second processing unit through a second path, the second processing unit performing display image generation processing involving a processing amount larger than a processing amount of the first processing unit, and performing control to allow first display information based on the first display data and second display information based on the second display data to be displayed on the touch panel display.

REFERENCE SIGNS LIST

80 LCD module
81 Touch panel display
82, 83 Driver IC
121 Driver LSI
141 AD conversion circuit
142 Capacitance value storing register
143 Rasterizer
144 Coordinate conversion circuit
145 system interface
146 Frame memory
147 setting storage unit
148 Display data generation unit

The invention claimed is:

1. A display control module comprising:

circuitry that obtains sensor data of a touch input position by a user from a touch sensor, converts the sensor data into first coordinate position data, outputs the first coordinate position data to a processor that performs a process of calibration on the first coordinate position data,
obtains second coordinate position data from the processor, the second coordinate position data comprising data after the process of calibration,
outputs the first coordinate position data to a display device as first display information, and
outputs the second coordinate position data to the display device as second display information,
wherein a first coordinate position represented by the first coordinate position data is different from a second coordinate position represented by the second coordinate position data.

2. The display control module according to claim 1, further comprising:
a memory that stores a drawing color information for the first display information, the drawing color information being set by the processor according to an application executed in the processor,
wherein the circuitry outputs to the display device the first display information including the drawing color information.

3. The display control module according to claim 2, wherein the circuitry determines the drawing color information according to a color of a background image displayed on the display device.

4. The display control module according to claim 1, wherein the circuitry controls the display device to update the first display information at shorter intervals than the second display information.

5. The display control module according to claim 1, wherein the circuitry controls the display device to overlap the second display information on the first display information while gradually increasing transmittance of the first display information.

6. The display control module according to claim 1,
wherein the display device includes a first display area and a second display area, and
wherein the circuitry controls the display device to display the first display information and prohibits the display device from displaying the first display information within the second display area.

7. The display control module according to claim 1, wherein
the display device is a touch display panel that includes the touch sensor.

8. A display control method comprising:
obtaining sensor data of a hand gesture input by a user from a sensor configured to receive a position of a hand of the user;
converting the sensor data into first coordinate position data;
outputting the first coordinate position data to a processor that performs a process of calibration on the first coordinate position data;
obtaining second coordinate position data from the processor, the second coordinate position data comprising data after the process of calibration;
outputting the first coordinate position data to a display device as first display information; and
outputting the second coordinate position data to the display device as second display information,
wherein a first coordinate position represented by first coordinate position information is different from a second coordinate position represented by second coordinate position information.

9. The display control method according to claim 8, further comprising:
controlling the display device to update the first display information at shorter intervals than the second display information.

10. The display control method according to claim 8, further comprising:
controlling the display device to overlap the second display information on the first display information while gradually increasing transmittance of the first display information.

11. At least one non-transitory computer-readable medium encoded with instructions which, when executed by a display control system including at least one processor, a display device and a sensor, cause the display control system to:
obtain sensor data of a hand gesture input by a user from the sensor;
convert the sensor data into first coordinate position data;
output the first coordinate position data to the at least one processor that performs a process of calibration on the first coordinate position data;
obtain second coordinate position data from the at least one processor, the second coordinate position data comprising data after the process of calibration;
output the first coordinate position data to the display device as first display information; and
output the second coordinate position data to the display device as second display information,
wherein a first coordinate position represented by first coordinate position information is different from a second coordinate position represented by second coordinate position information.

12. The least one non-transitory computer-readable medium according to claim 11, encoded with additional instructions which, when executed by the display control system, further cause the display control system to:
control the display device to update the first display information at shorter intervals than the second display information.

13. The least one non-transitory computer-readable medium according to claim 11, encoded with additional instructions which, when executed by the display control system, further cause the display control system to:
control the display device to overlap the second display information on the first display information while gradually increasing transmittance of the first display information.

* * * * *